United States Patent [19]

Kimbell et al.

[11] Patent Number: 4,471,644
[45] Date of Patent: Sep. 18, 1984

[54] APPARATUS FOR MECHANICALLY TREATING METAL COMPONENTS

[75] Inventors: John Kimbell, Grellingen; Werner Uehlinger, Arlesheim, both of Switzerland

[73] Assignee: KM-Engineering AG, Basel, Switzerland

[21] Appl. No.: 298,824

[22] Filed: Sep. 2, 1981

[51] Int. Cl.³ ............................................. B21J 11/00
[52] U.S. Cl. ........................................ 72/405; 72/449; 72/452; 198/476; 198/487; 29/563; 83/267; 83/733
[58] Field of Search .............. 72/404, 405, 94, 190, 72/191, 449, 452, 414; 198/480, 485, 487, 476; 29/563, 564, 564.7, 785; 83/266, 267, 733; 408/71

[56] References Cited

U.S. PATENT DOCUMENTS

| | | | |
|---|---|---|---|
| 2,895,443 | 7/1959 | Gavazzi . | |
| 3,289,450 | 12/1966 | Clements | 72/456 |
| 3,446,167 | 5/1969 | Armbruster et al. . | |
| 3,635,069 | 1/1972 | Eickenhorst . | |
| 3,754,667 | 8/1973 | Storch . | |
| 3,815,402 | 6/1974 | Duran et al. | 72/404 |
| 4,287,748 | 9/1981 | Wolfthal | 72/405 |
| 4,364,257 | 12/1982 | Endo et al. | 72/405 |

FOREIGN PATENT DOCUMENTS

| | | |
|---|---|---|
| 1105831 | 11/1961 | Fed. Rep. of Germany . |
| 3287307 | 5/1976 | France . |
| 2316069 | 1/1977 | France . |
| 2412376 | 7/1979 | France . |
| 955339 | 4/1964 | United Kingdom . |
| 1509905 | 5/1978 | United Kingdom . |
| 1592156 | 7/1981 | United Kingdom . |
| 567531 | 8/1977 | U.S.S.R. ............... 72/405 |
| 747604 | 6/1980 | U.S.S.R. ............... 72/405 |
| 755383 | 8/1980 | U.S.S.R. ............... 72/405 |

Primary Examiner—Daniel C. Crane
Assistant Examiner—David B. Jones
Attorney, Agent, or Firm—Ladas & Parry

[57] ABSTRACT

A machine for mechanically treating components, such as metallic hollow members having a body and a bottom. The machine has a stationary frame bearing a plurality of work stations each of which has a tool pair including a first fixed tool coaxial with a movable second tool. The first and second tools are arranged on two coaxial circular paths with the first tool of each pair on a bolster. The second tool of each pair is on one end of a ram member having a tool bearing end and an actuated end. The ram member is slidably supported in guiding means. The actuated end of the ram member is connected to a cylindrical actuating cam having a free end in contact with the actuated ram member end. At least one pair of the tools are different than another pair. The tool bolster is immovable, the cam is rotated and transfer mechanisms are associated with the machine so that each component is treated by at least two different pairs of tools.

32 Claims, 47 Drawing Figures

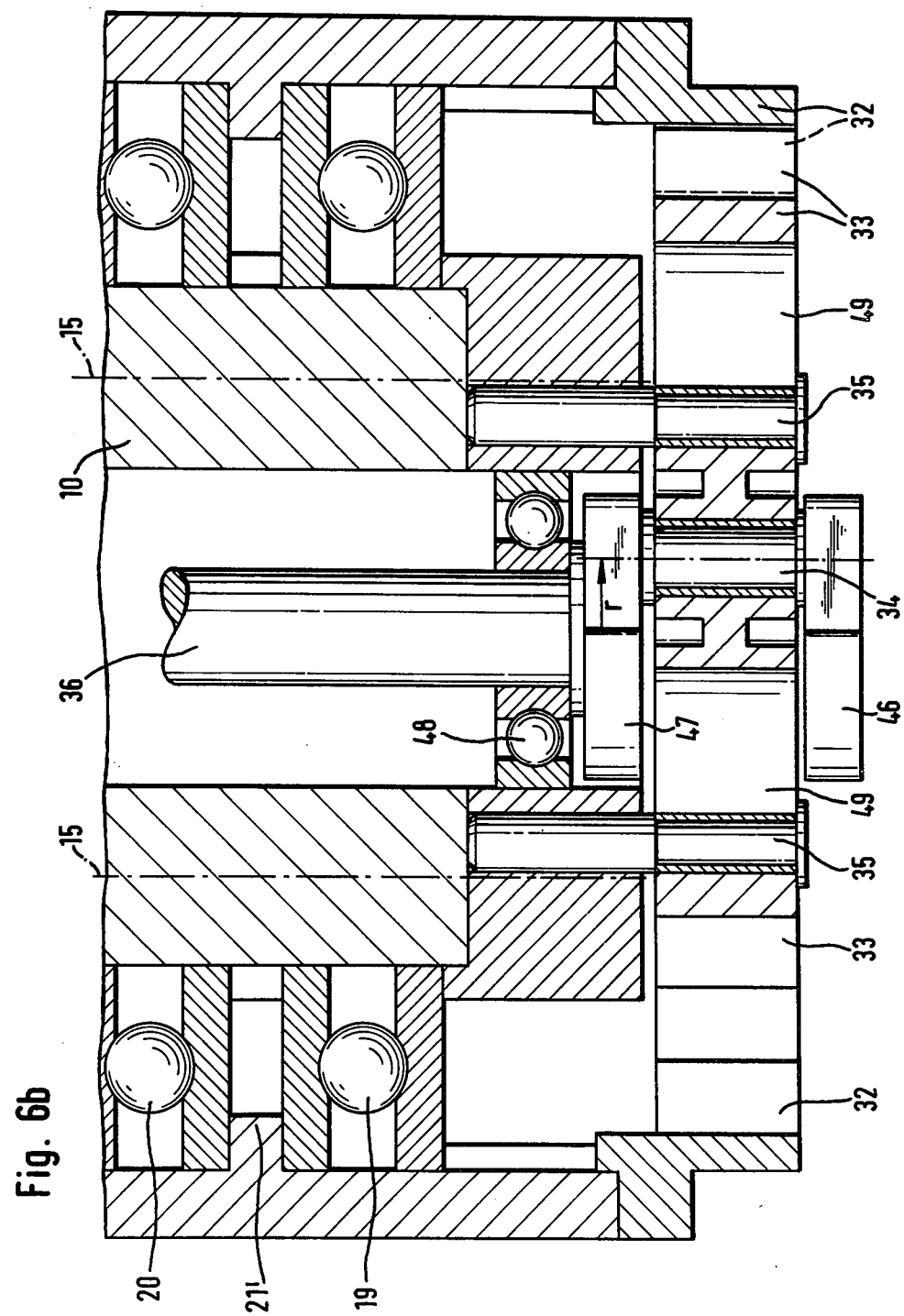

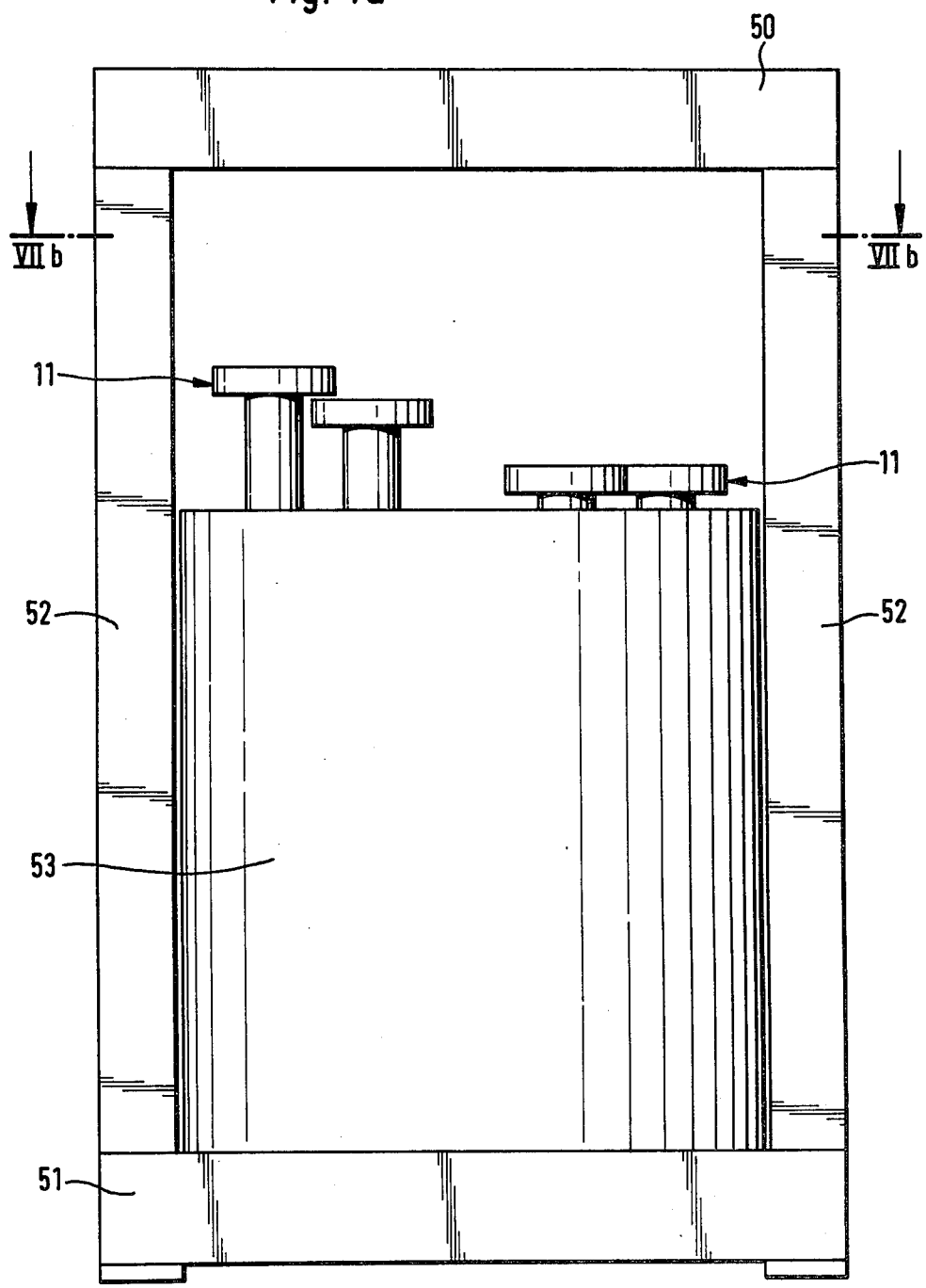

RELATIVE PATH

APPARATUS FOR MECHANICALLY TREATING METAL COMPONENTS

In the manufacture of components made from sheet metal usually at least three or four distinct operations are required for completion. Typical examples are drawn and ironed cans (D&I) and drawn and redrawn cans (DrD).

The manufacturing equipment has been evolving over the years according to the demand, from simple solutions comprising individual presses with single tools and manual transfer of components, through designs whereby the transfer was mechanized, to single stream transfer presses in which the progress of components between tools is carried out by gripper mechanisms, and to large presses capable of accepting more than one stream of components, the so-called multi-stream transfer presses.

In the case of high volume production the multi-stream transfer presses, being the obvious solutions, have been developed and successfully applied in practice, producing components at an economic level. Low demands may be satisfied by single stream transfer presses, but at a higher cost because the ratio of capital investment per component produced is higher. This is due to the complexity of the mechanisms involved, revealing the need for cheaper and yet equally reliable solutions.

In any type of pressworking machinery, when considering the events during the time of making of one component, i.e. one cycle, useful work is performed during only a small fraction of the cycle. Large flywheels are normally employed to provide the required energy. During the working part of the cycle the flywheel slows down, losing energy, and the lost energy is recovered during the idle part of the cycle as the flywheel angular velocity is increased once more to its idling value. By design, the transfer presses not only require larger driving mechanisms, but also must have the mechanical structure capable of withstanding the sum of the process loads in each tool. Hence the structures of transfer presses tend to be heavy and expensive. However transfer presses have a small number of moving parts. In an attempt to decrease the size of the driving mechanisms, it has been proposed to use a series of "C" type crank presses operating out of phase with the crankshafts in line, and coupled together and driven by one power unit. This has the advantage of almost constant torque throughout the cycle and hence requires a smaller power unit. However, each press, being independent, requires a suitable press frame with an appropriate amount of metal for stiffness, which performs a useful function for a small fraction of the cycle only.

Most transfer presses are of vertical type with the punch moving down and up with the bottom dead center designated for tool engagement. In such cases the component transfer mechanism operates in the horizontal plane, the tool array being arranged along a straight line, and the gripper pockets handling the components stop when reaching the tool position. Hence the transfer mechanism must provide a suitably controlled motion of the gripper pockets, usually along a D shape path, with acceptable acceleration and deceleration. The mechanism must be stiff enough to ensure precision of transfer. A stiffer mechanism is stronger and heavier and generates higher inertia forces, and is also inevitably more expensive to set up. In some low speed applications, where the presses move horizontally, walking beam transfer mechanisms have been used, whereby the transfer pockets are attached to a straight beam which performs a parallel rotary motion. The component is collected by the gripper pocket at finite velocity and is also deposited in a suitable seat in the following tool at finite velocity. In this case the transfer mechanism is extremely simple, since rotary motion only is involved. The inevitable impact between the component, transfer pocket and tool nest is compensated by attention to detail design and by operating at low speed.

According to a first aspect of the present invention there is provided a method of mechanically treating metal components at a plurality of work stations arranged on a circular path and each provided with a tool, comprising advancing the components sequentially in stepwise fashion, each from one station to at least another station along said circular path, and applying force to the components by means of the tools at the respective work stations, said tools being operated consecutively and each being subjected to a periodical reciprocating action perpendicular to the directions in which components enter and leave the associated work station.

According to a second aspect of the present invention there is provided a machine for mechanically treating metal components, comprising means defining a plurality of work stations arranged on a circular path, a transfer mechanism for advancing the components sequentially in stepwise fashion, each from one station to at least another station along said circular path, a plurality of tools provided at the work stations respectively, each tool having a working part which is constrained to move perpendicularly to the directions in which components enter and leave the associated work station, and means for operating each tool while a component is disposed at the associated work station and for operating all of said tools consecutively.

The present invention may be used to provide a transfer press having a tool array arranged along a circular path, the tools being actuated progressively by a single heavy duty cam provided with a suitable "lift" along the working part. The cam profile should ensure the lowest possible contact stresses between the cam followers attached to reciprocating rams, each ram carrying a different die. The cam profile includes also a "dwell" portion, which maintains the followers and the rams with dies in a stationary position during the part of the cycle when transfer of components takes place. The cam is rotatably mounted on a cylindrical press stern around which ram carriers are equally spaced. The press stern is in a form of a robust thick walled tube, capable of resisting bending when the load is applied by the cam and resisted by a circular bolster attached to the top of the stern. While the press is in operation, the stern is loaded continuously as tools are being engaged successively. Likewise the driving provisions do not require any flywheel, since at any one time only one tool is in fully engaged position.

According to a third aspect of the present invention there is provided a transfer mechanism, for transferring components sequentially in stepwise fashion from one station to at least one additional station, said stations each defining a center and said centers being arranged on a first circle in equiangularly spaced relation, the mechanism comprising a carrier member, a plurality of pocket members carried by said carrier member, each pocket member being adapted to receive a component for transporting it as the carrier member rotates and defining a center, the centers of the pocket members being on a second circle in equiangularly spaced relation, and support means supporting the carrier member so that the center of the second circle is spaced from the center of the first circle and so that the carrier member is rotatable about the center of the first circle without rotating about the center of the second circle, whereby the center of each pocket member moves in a circle passing through two adjacent stations.

The invention may thus be used to provide a transfer mechanism capable of transferring the components successively one component at a time from tool to tool, and of collecting a blank from outside of the press and feeding it into the first tool, and ejecting the finished component from the last tool. The transfer mechanism may perform a "pericycloidal" motion around the tools, being based on a curved "walking beam" principle, taking the shape of a complete ring embracing the tool array, having a number of transfer pockets corresponding to the number of tools in the press, or an integral multiple of that number, leaving at least one idle position between the tools in which the component waits for the duration of one cycle. The transfer ring provided with suitable gripper pockets performs a rotary-parallel motion in such a way, that the center of each pocket passes through the axes of two tools, collecting the component from the first tool and depositing it in the following tool, while moving along a circular path. The transfer ring is driven by a crank, which is intergeared with the driving cam, and is also supported by at least two further "idler cranks" to guarantee the parallel-rotary motion. The length of the driving crank, which is equal to the radius of the circular path along which the transfer pockets move, depends on the timing of the transfer, if for example half a cycle is allowed for transfer, i.e. 180°, the crank radius would be equal to half of the distance between the tool axes, the distance between tools being related to the transfer path radius by the sine of half of the feeding angle. The gripper pockets are provided with holding features, either magnetic or vacuum-based, to ensure total control and reliability.

The transfer mechanism based on a "pericycloidal motion" has speed limitations, due to finite contact velocity between the transfer pockets and the components, it is suitable for low output requirements and is inexpensive.

According to a fourth aspect of the present invention there is provided a transfer mechanism, for transferring components sequentially in stepwise fashion from one station to at least one additional station, said stations each defining a center and said centers being arranged on a first circle in equiangularly spaced relation, the mechanism comprising a first gear having its pitch circle equal in diameter to said first circle and having the center of said first circle on its central axis, and a turret assembly comprising first, second and third turrets each defining a plurality of pockets for receiving components, each pocket defining a center and the centers of the pockets of the three turrets being on first, second and third turret circles respectively, each turret also being provided with a gear having its pitch circle equal in diameter to the respective turret circle and having the centre of the turret circle on its central axis, the gears of the first and second turrets being in meshing engagement with the gear of the third turret, and the mechanism further comprising support means whereby the turret assembly is supported so that the gears of the first and second turrets are in meshing engagement with said first gear and the turret assembly is rotatable about the center of said first circle, accompanied by rotation of the turrets, the pockets of the first and second turrets registering successively with said stations and with the pockets of the third turret, whereby a component can be collected from said one station by said first turret, transferred to the second turret by way of said third turret, and deposited in said additional station by said third turret.

The invention may thus be extended in accordance with the fourth aspect to provide a transfer mechanism suitable for high output requirements, capable of transferring components successively, up to five components at a time from tool to tool between operations, as well as collecting blanks from the outside of the press and feeding them into the first tool or tools, and ejecting the finished components from the last tool or tools. Such a transfer mechanism performs an epicycloidal motion and comprises a set of three turrets, two of which cooperate with the tool array and the third connects them, being intergeared. The set of these three turrets orbits around the tool array. There is a stationary gear the pitch circle of which coincides with the pitch circle of the tools. The two turrets which cooperate with the tool array are driven by gears directly meshing with the stationary gear. The turret driving gears' pitch circles are equal to the pitch circles of the turrets. Consequently the component is placed in tools at zero velocity, likewise it is collected from the tools at zero contact velocity, and yet the set of the three turrets performs a constant velocity epicycloidal motion, free of any intermittently-operating cams and linkage mechanisms. The epicycloidal handling system of components may be employed for transfer of components at four different stages of treatment, and may be used to serve one, two or three sets of tools in the same press, thus satisfying high output requirements. The set of the three turrets can gyrate around the tool array at a speed of up to 200 revolutions per minute, and would provide a corresponding output depending whether one, two or three sets of tools have been provided in the press. This is most desirable in production of two-piece cans. For adequate component control during the transfer, the pockets in the turrets may be provided with magnetic and vacuum features, mechanical means not however being excluded. The three turret handling system allows a longer part of the cycle for the operation of tools, hence the cam may have a milder slope and higher lift.

The present invention may also be used to provide a "package deal" system for economic low output two-piece can bodymaking by D&I and by DrD processes, the system incorporating: the basic, vertical multi-ram, rotary cam, single action press, and the circular beam transfer system with the number of pockets related to the number of rams, performing rotary parallel motion synchronized with the ram actuating cam, and suitable tools to carry out required operations dictated by the given process, these tools being of KME design (U.S. Pat. No. 3,924,437) or any other design suitable for single action operation. The system may be fed with individual blanks or with metal sheet material in strip and coil form, the material being plain, lacquer coated or plastic film laminated tinplate, aluminum, blackplate and nickelplated steel; or lacquer coated and plastic film laminated chromium plated steel known generally as TFS. The system is capable of: feeding the material stock precisely using the same driving provisions as for the transfer mechanism, cutting out suitable blanks, and ejecting the residual skeleton from the tool area after chopping to manageable fragments.

The present invention may also be used to provide a new configuration in press design, suitable for vertical types and general application for manufacture of products requiring multi-stage press operations, in which the crank actuation has been superceded by cams and cam derivatives, capable of successive operation of rams with dies, through suitable followers.

The press stern may be central to correspond to "C" frame design, or there may be four external pillars, similar to those in "H" press frame. Similarly the transfer system may be of external type embracing the tool array, as described; or it may be within the tool array.

For a better understanding of the invention, and to show how the same may be carried into effect, reference will now be made, by way of example, to the accompanying drawings in which FIG. 1 shows diagrammatically a typical multi-die "H" frame press with a heavy flywheel;

FIG. 6b is a sectional view taken on the VIb—VIb of FIG. 6a;

FIG. 6c shows in simplified form successive positions of the components shown in FIG. 6a;

FIG. 7a shows diagrammatically a side elevation of a second transfer press according to the invention;

FIG. 7b is a sectional view taken on the line VIIb—VIIb of FIG. 7a;

Figure 1:
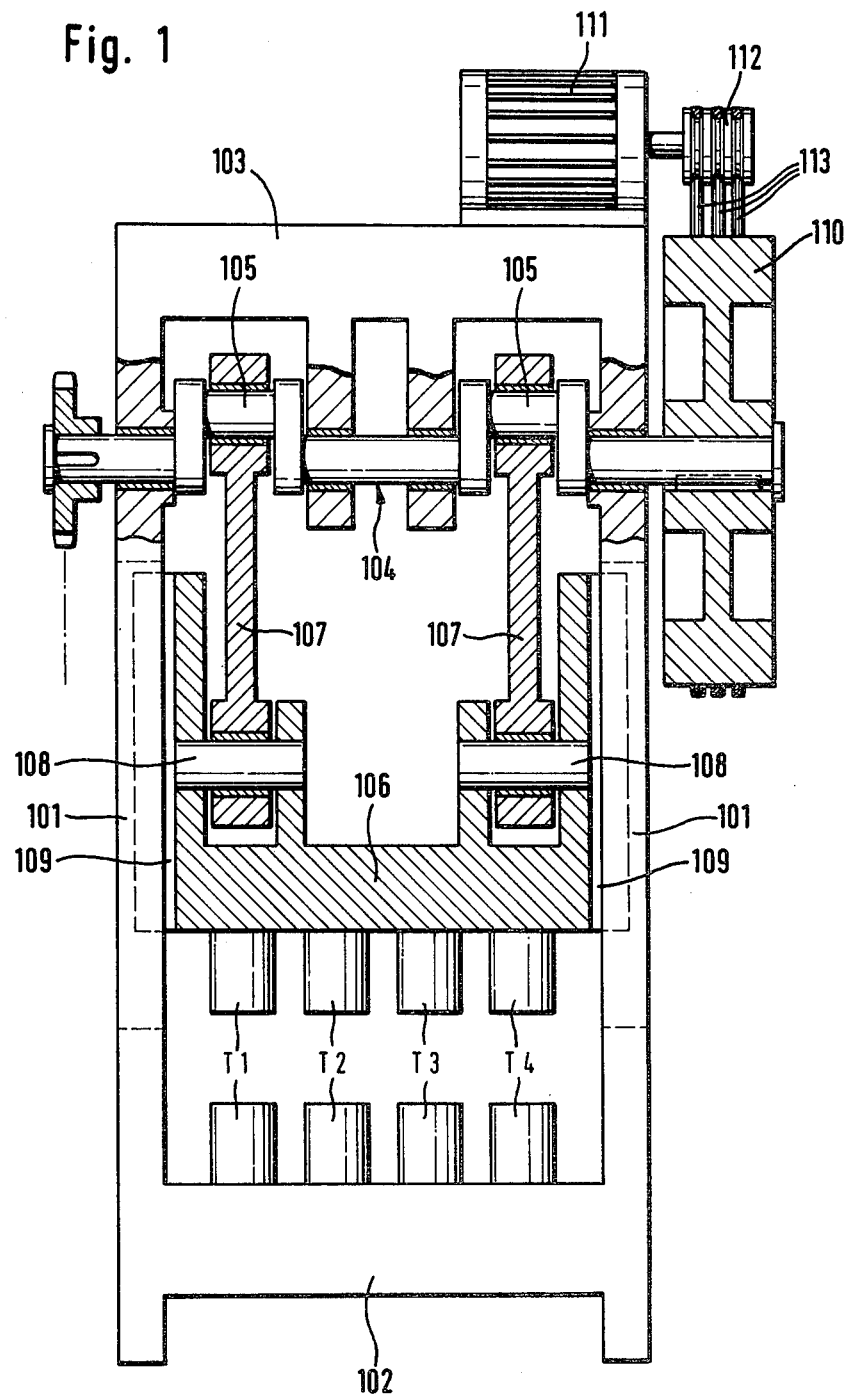
FIGS. 8-1 to 8-6 shows plan views, at six consecutive positions, of a first transfer mechanism according to the invention.

Referring to FIG. 1 which shows a scheme of a typical multi-die "H" frame press, there is a stiff vertical press structure 101 supported on a press bed 102, and carrying press crown 103, all being clamped together by tie rods (not shown), so structures 101, 102, 103 are under compressive pre-load. Press crown 103 is equipped with bearings which support crankshaft 104 provided with two crankthrows 105 which actuate the crosshead 106 through connecting rods 107 and gudgeon pins 108. The crosshead 106 is guided precisely by linear bearings 109. The crankshaft 104 is rotated by flywheel 110 which is driven by motor 111 through pulley 112 and vee-belts 113. Tools T1, T2, T3 and T4 are attached to press bed 102 and to the crosshead 106. By rotating the crankshaft 104 crosshead 106 moves down and up and tools close and open in synchronism performing the allotted tasks. Since the tools move in synchronism, the tonnage which must be applied to the crosshead is equal to the sum of individual loads of the tools. The energy necessary is supplied by the flywheel 110, which slows when the tools close and regains its speed when the tools separate. Such presses may operate more tools, being loaded then proportionally higher.

Figure 2A:
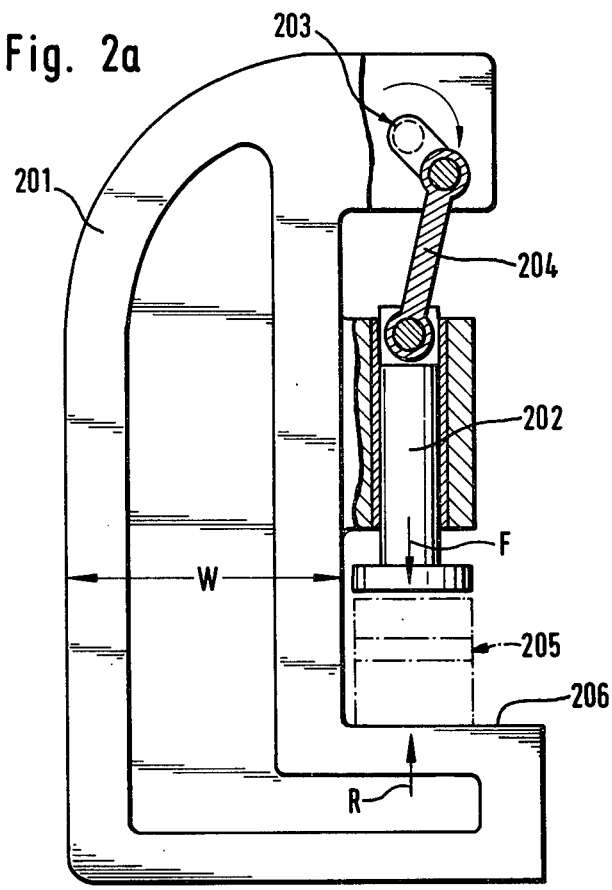
FIG. 2a shows diagrammatically a "C" frame press.
Figure 2B:
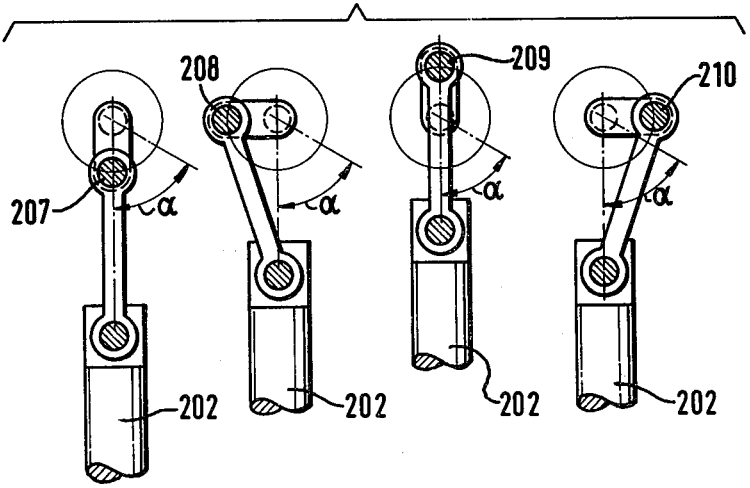
FIG. 2b shows application of the "C" frame press to multiple tools.

FIG. 2a represents the "C" type press, of which the frame structure 201 is characterized by width "W" opposite the throat between ram 202 and bolster 206 which accept tools 205. The ram 202 is actuated by crankshaft 203 through conrod 204. Ram 202 imposes a force "F" on tools 205 which induces a reaction R in bolster 206. Depending on the press load rating, normally expressed in "tonnes", width "W" of the press frame is established to keep the bending stresses within safe limits and to maintain the deflection at acceptable low values. This means, that a volume of metal has to be contained in the frame for satisfactory performance. For the manufacture of products which require more operations, a separate press for each tool is required. FIG. 2b shows diagrammatically the case of four presses, the crankshafts of which may be arranged at advantageous phase angles so that only one crankshaft at a time is turning through the working angle "α" (during which the punch penetrates the die). At position 207 with ram 202 at BDC work has been completed. At the same time the second press crank at position 208 is opening. The third press crank is fully open at position 209, with the ram at TDC, while the forth unit with the crankshaft at 210 position is closing. If the four crankshafts are coupled, then at any one time only one tool is operating, requiring only a medium size or small flywheel compared with that shown in FIG. 1.

Figure 3:
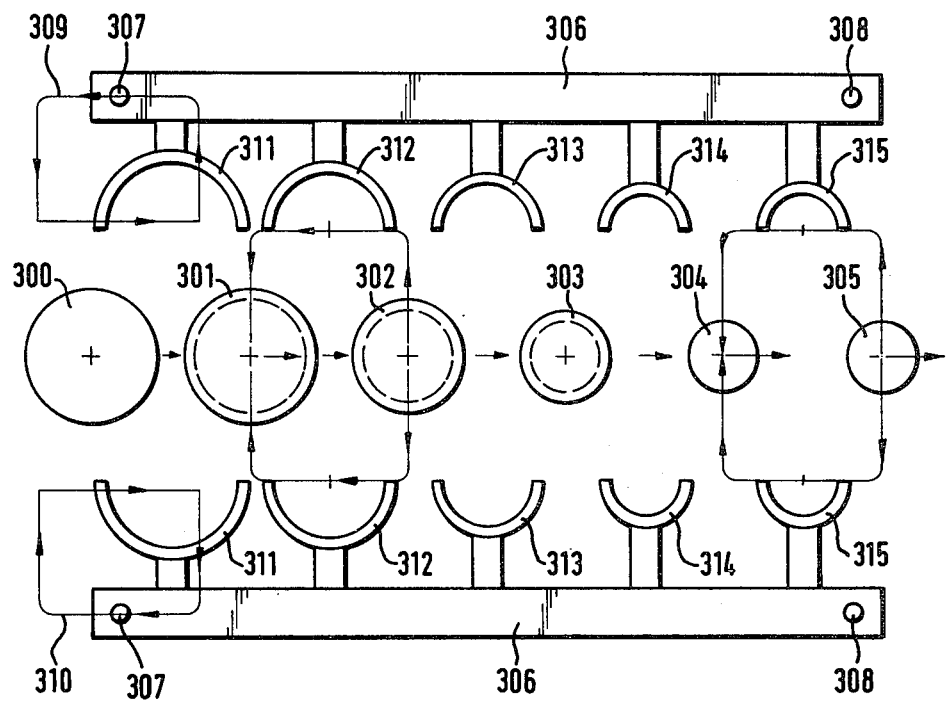
FIG. 3 shows diagrammatically a gripper transfer performing "D" motion.

FIG. 3 illustrates a gripper transfer mechanism in which the transfer pockets move along a "D" shape path. Such an arrangement is most suitable for transfer presses similar to that in FIG. 1. Referring to FIG. 3, blanks are stacked at position 300. Single units are delivered to tool 301 where (as shown in this case for clarity) it is drawn into a cup and promptly moved into tool 302 for first redraw operation, then to tool 303 for second redraw and 304 for trimming operation to be then ejected into position 305 ready to leave the machine. The transfer arrangement operates in such a way, that the components at each stage of production move simultaneously from tool to tool, being embraced by half-pockets attached to gripper bars 306 supported at points 307 and 308, which move along "D" shape paths 309 and 310. Gripper bars 306 carry half pockets 311, 312, 313, 314 and 315.

Figure 4:
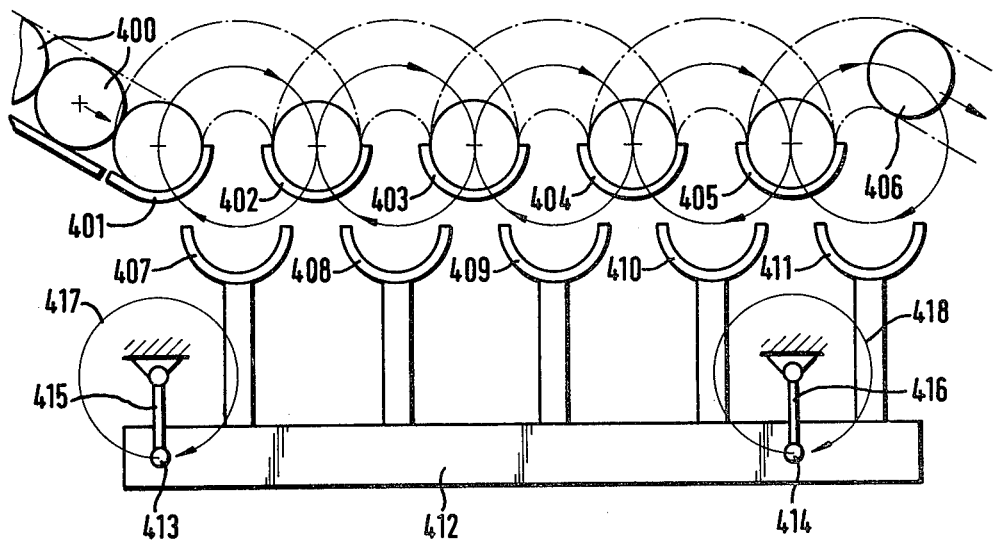
FIG. 4 shows the principle of the walking beam transfer mechanism.

FIG. 4 shows the principle of the so-called "Walking Beam" transfer mechanism. In this case cylindrical objects 401 roll down into a waiting position 402 which is in the form of semicircular nest. There are four treatment positions defined by semi-circular nests 402, 403, 404 and 405 in which objects 401 rest by means of gravity. There are five semi-circular transfer pockets 407, 408, 409, 410 and 411. The centers of these pockets move along circular paths passing through centers of the nests 402, 403, 404 and 405. The transfer pockets are attached to gripper bar 412 which is suspended in points 413 and 414. The two points 413 and 414 are guided along circular paths 417 and 418 traced by crankpins 415 and 416. Here the transfer pockets 407 to 411 meet the objects 401 at finite velocity and deposit them in successive pockets also at finite velocity. During the travel from position to position the force due to gravity holds the objects in the transfer pockets. The last transfer pocket 411 deposits objects 401 at the position 406, from which it is allowed to roll down. This type of transfer system is simple as it employs rotary and constant velocity motion. Because of finite contact velocity the speed potential is limited. If applied in the horizontal plane, so that gravity could not be used to hold the objects in the transfer pockets, the objects may be held in the pockets by means of magnets or suction, and if the transferred objects have a low mass, then the operating speed could be increased.

Figure 5:
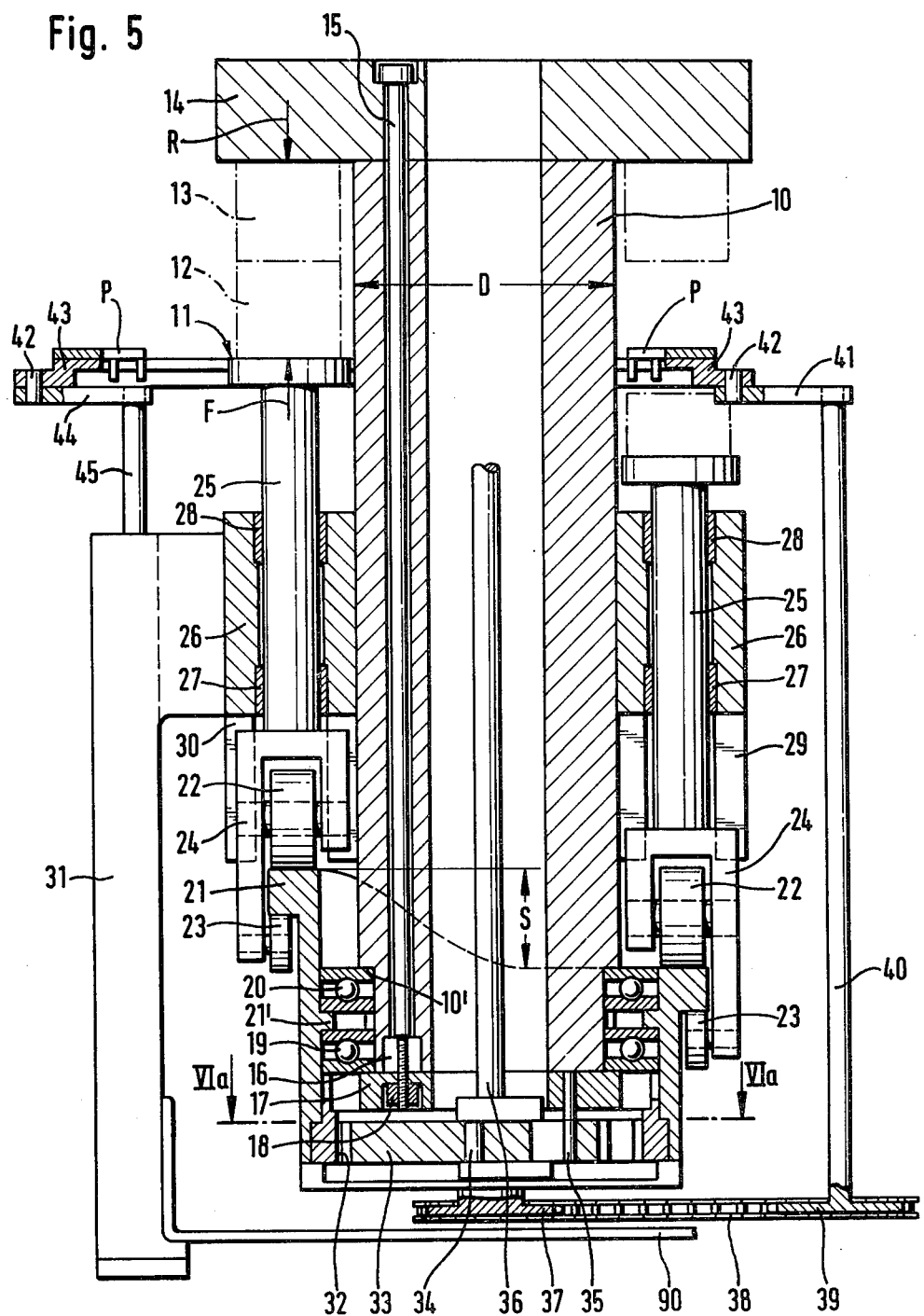
FIG. 5 shows diagrammatically, partly in elevation and partly in section, a transfer press according to the invention.
Figures 1, 8:
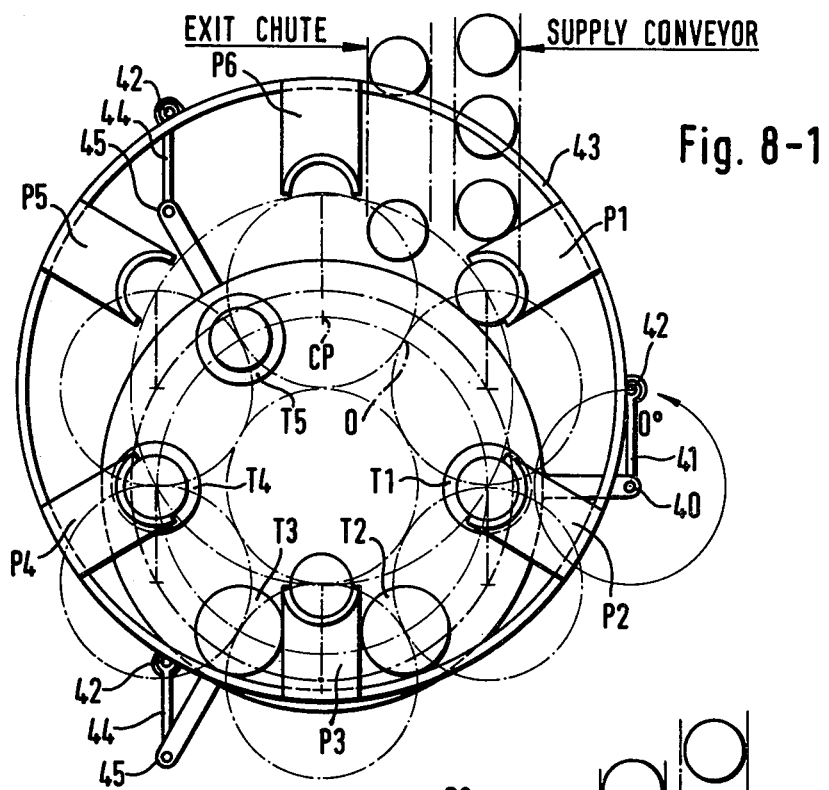
Figures 2, 8:
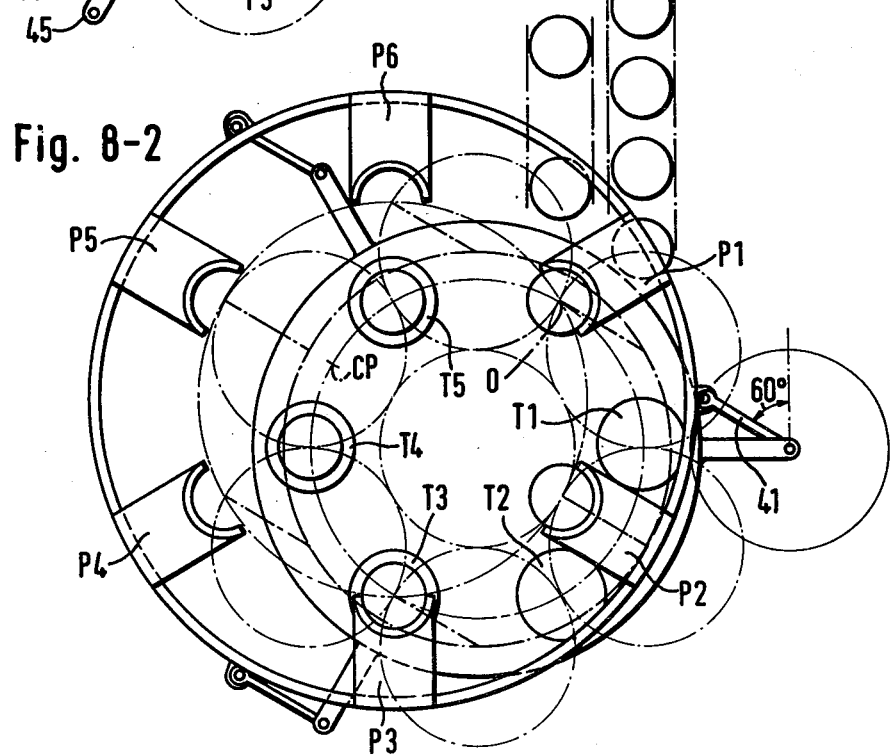
Figures 3, 8:
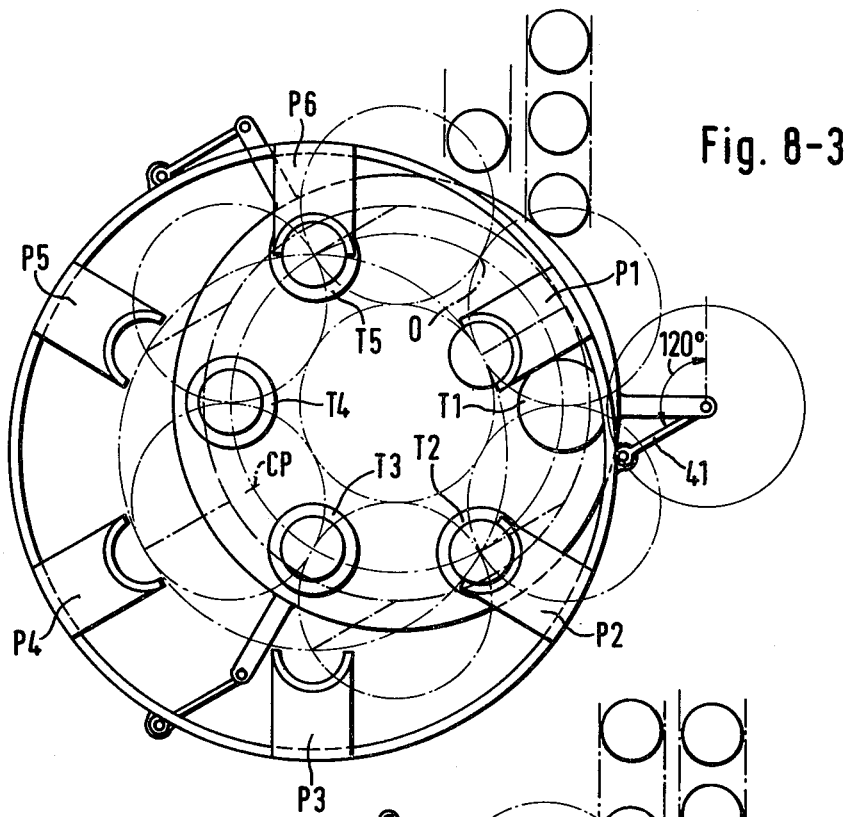
Figures 4, 8:
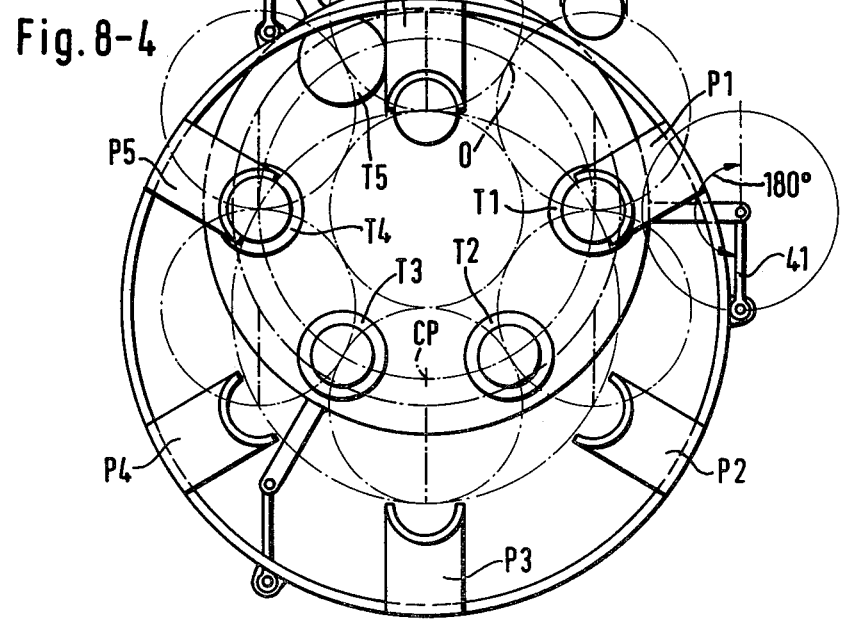
Figures 5, 8:
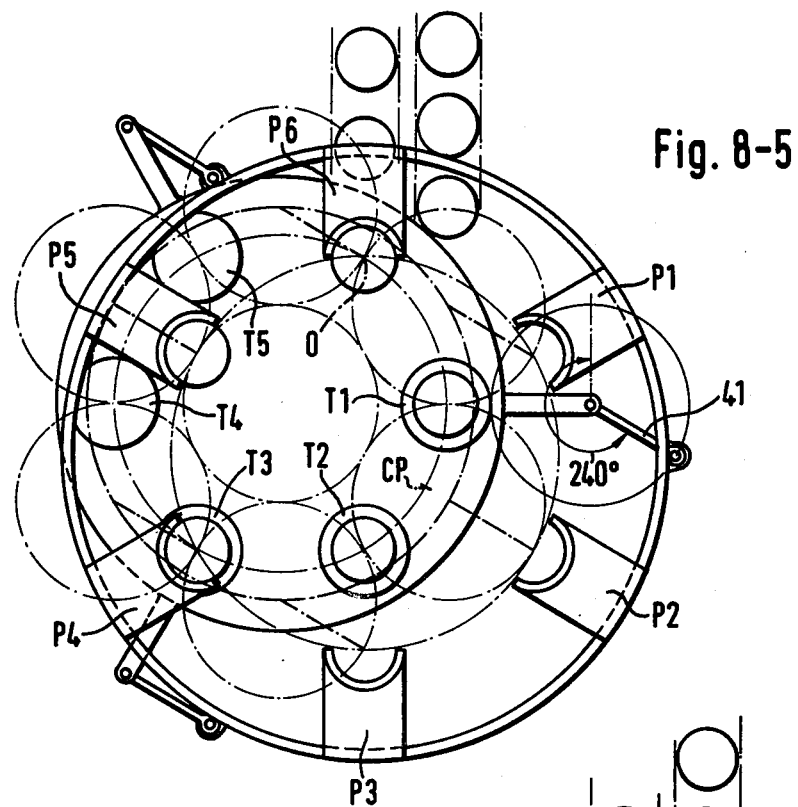

FIG. 5 shows schematically the press according to the invention assuming a similar "tonnage" capacity to that of the press frame or illustrated in FIG. 2. In this case the press stern 10 has diameter "D" which bears direct relationship with width W. Stern 10 is surrounded by a number of ram assemblies 11 carrying dies 12 cooperating with punches 13 attached to bolster 14 which is of circular shape. Bolster 14 is clamped to press stern 10 by several tie bolts 15, which maintain the press stern in a state of pre-loading compression. Tie bolts 15 are anchored to the base of stern 10 by split-collars 16 embracing the bolts 15 at suitably provided recesses and trapped in the fitting counterbores in stern 10. Nuts 18 mounted on the tie bolts secure a clamping plate 17 to the base of the stern 10. A thrust bearing 19 is clamped between the plate 17 and a flange 21' of a cylindrical cam 21, and a thrust bearing 20 is clamped between the flange 21' and a shoulder 10' of the stern. Bearings 19 and 20 are located inside the cylindrical body of cam 21 which has a stroke "S" the value of which is closely related to the application and to the type of tools to be operated. Cam 21 cooperates with the ram assemblies 11 through follower rollers 22 and 23. Follower roller 22 has a substantial diameter and width to suit the specified tonnage. Follower 23 of smaller diameter maintains contact between cam 21 and follower 22. Both followers are mounted in a fork 24 attached to cylindrical ram 25 which reciprocates in housing 26 provided with linear bearings 27 and 28. Housing 26 is formed with slots 29 and 30 to guide fork 24 particularly when side thrust is induced when follower 22 climbs cam 21. Housing 26 is rigidly clamped to press stern 10 by bolts not shown. Ram assembly 11 represents therefore a self contained unit actuated by cam 21. At three positions around press stern 10 and between ram housings 26, three legs 31 are attached by bolts and dowels not shown. Legs 31 support the press stern and the ram assemblies, and also the base casting 90 which retains lubricating oil and provides a guard for the cam mechanism and the drive gear at the base of stern 10. Cam 21 is driven by internal gear 32, which meshes with gear 33 mounted on crankpin 34 attached at the end of long crankshaft 36. Four follower rolls comprising pins 35 rigidly mounted to retaining plate 17 and provided with respective rotatable sleeves cooperate in four circular holes in gear 33 to provide a necessary constraint for gear 33 to drive internal gear 32. Crankshaft 36 is driven on the top of the press by a highspeed motor not shown. The required reduction from say 1500 rpm to 60 rpm is obtained by this set-up in one step.

Drive is also taken from gear 32 to which a sprocket 37 is attached and provides motion through chain 38 to sprocket 39 at one to one ratio. Sprocket 39 is mounted at the end of long shaft 40, which carries at the top end a crank 41 driving a circular "walking beam", described with reference to FIG. 8. It can be seen that the press shown in FIG. 5 is most compact, the rams being built around the press stern.

Figure 6A:
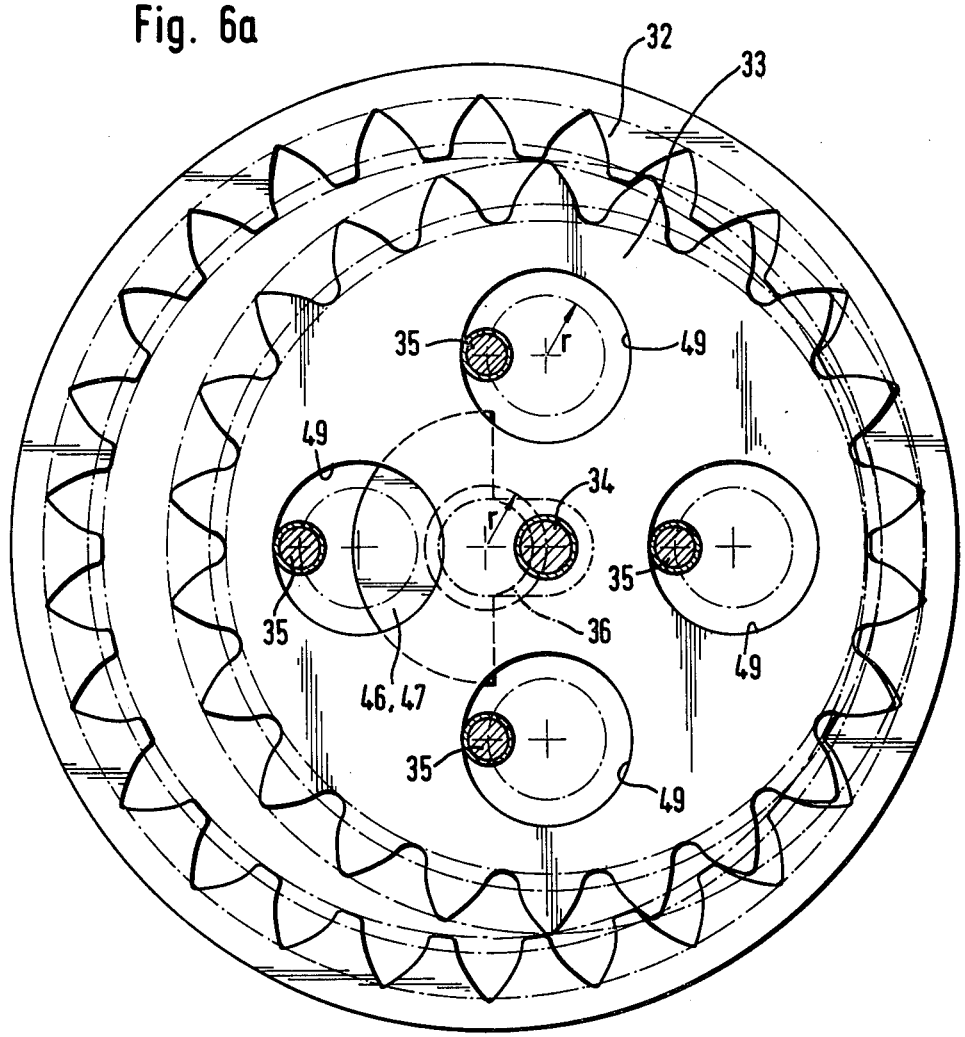
FIG. 6a is an enlarged sectional view taken on the line VIa—VIa of FIG. 5.

FIG. 6a shows a diagrammatic plan view and FIG. 6b a cross-section of the high reduction gear drive suitable for the transfer press according to the invention. Teeth and pitch lines and center lines are shown. There are two gears only, internal gear 32 attached to the rotating cam and gear 33 mounted on crank pin 34 attached to crankshaft 36. The speed reduction ratio i is given by the formula: $i = t_{32}/t_{32} - t_{33}$ Hence if gear 32 has 100 teeth and gear 33 has 96 teeth, then i=25, which would reduce 1500 rpm to 60 rpm in one stage.

For clarity FIG. 6a shows fewer teeth. Gear 33 has a central hole in which crank pin 34 turns; it also has four holes 49 of diameter equal to the sum of the diameter of the crankpin 34 pitch and the diameter of the stationary pin 35. The pins 35 prevent rotation of gear 33 about its own center, thus forcing it to perform a parallel rotary motion about the center of gear 32. In each revolution of gear 33 about the center of gear 32, the latter is shifted angularly by the difference of teeth between gears 32 and 33. Since the mass of gear 33 gyrates on a radius r, equal to the distance between the centers of the gears 32 and 33, it induces a centrifugal force, and balance weights 46 and 47 are provided to minimize the cyclic force on the crankshaft bearing 48.

Figure 6C:
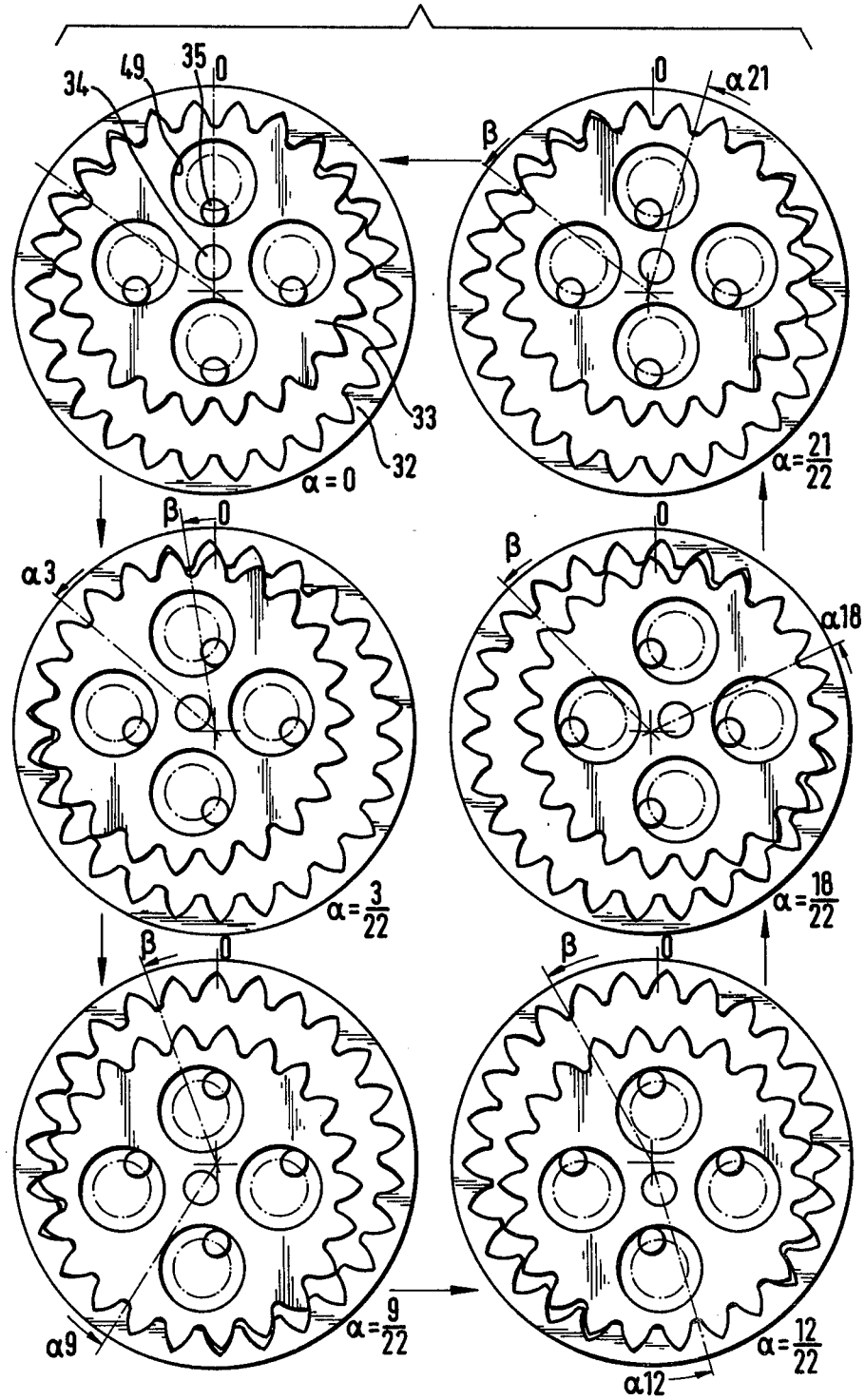

FIG. 6c illustrates the progressive positions of the high reduction gear system. For clarity gear 32 is shown with 26 teeth and gear 33 with 22 teeth. The starting position of crankpin 34 is considered as 12 o'clock, the angle α between the radius to the crank pin center and a line extending vertically in FIG. 6b is zero at that position. It should be noted that at that position stationary pins 35 are at the bottom of circular holes 49. Subsequent positions of crank pin 34 are equivalent to 3/22, 9/22, 12/22, 18/22 and 21/22 of 360° rotation of the crankshaft. It can be seen that gear 33 does not rotate, since the axes passing through circular holes 49 remain vertical and horizontal. Angle of rotation β of gear 32 has been indicated at the progressive position showing clearly four teeth difference after 360°, i.e. 4/26×360°.

Figure 7B:
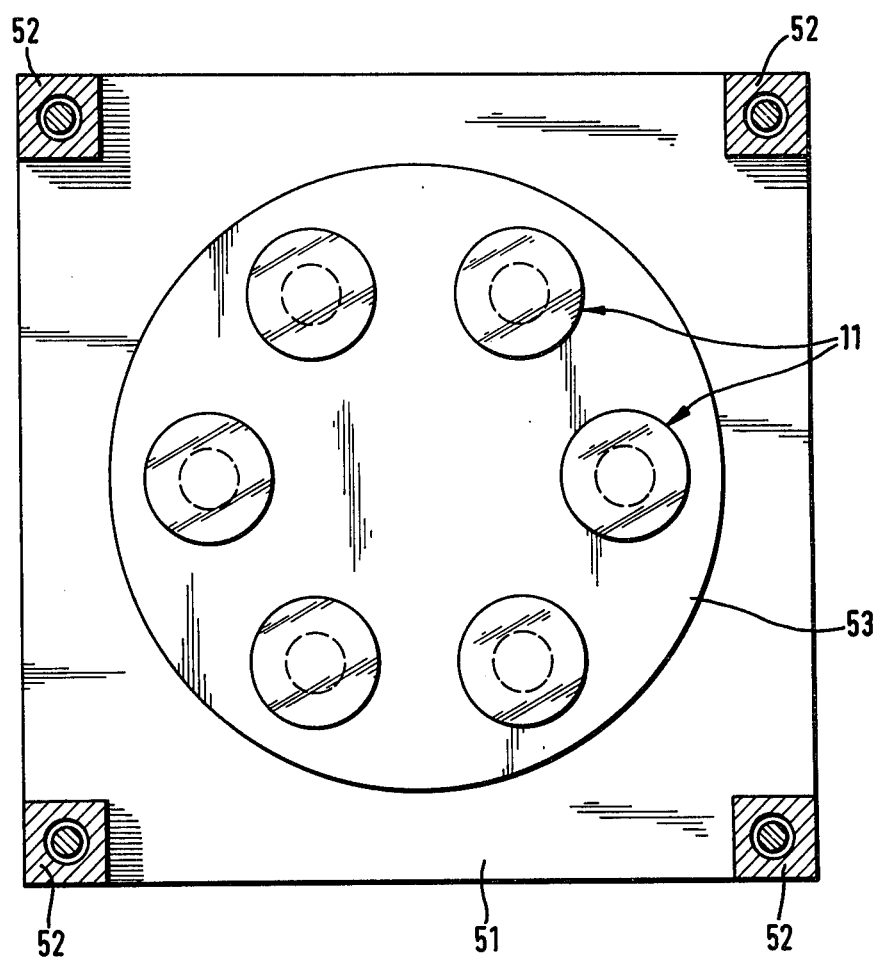

FIGS. 7a and 7b show a modification of the FIG. 5 press in which the central press stern is replaced by four external pillars, thus providing a similarity with an "H" frame press. An extended bolster plate 50 on top is connected to the base plate 51 by four pillars 52. Hence the press loads are not taken by the tie bolts in the center stern, but by similar tie bolts placed in the four pillars. The drive mechanism for the ram assemblies 11 is placed in box 53.

FIG. 8 illustrates the principle of the circular walking beam transfer mechanism. For clarity, a six station unit is shown, with five tool positions designated T1 to T5 and an idle position designated 0. In FIG. 8-1 the driving crank 41 is in 12 o'clock position indicating zero cycle angle. The mechanism comprises a transfer ring 43 provided with three mounting pins 42. Two of the pins 42 are connected to idling arms 44 which are mounted on bearing posts 45 attached to the press legs 31 (FIG. 4). The third pin 42 is connected to the driving crank 41. Thus, as the shaft 40 rotates the ring 43 gyrates about the center of the press stern 10, the two idling arms 44 always maintaining a parallel relationship to the driving crank 41. There are six pockets, numbered P1 to P6, attached to transfer ring 43. FIG. 8-1 shows the ring at a cycle angle (the angle between the crank 41 and a line bisecting the angle between the radii from the crankshaft 36 to the positions 0 and 5) of 0° with pocket 1 collecting a blank from the supply conveyor. At the same time pocket 2 makes contact with the component in tool 1; pocket 3 is in a midway position between tool 2 and tool 3; pocket 4 has just delivered a component into tool 4; tool 5 is in closing position (the cam peak is approaching tool 5); pocket 5 has left tool 5 and is on the way to tool 4; and pocket 6 has just delivered a component into the exit chute.

FIG. 8-2 shows the transfer mechanism at a cycle angle of 60°, the driving crank 41 having moved through 60° in counterclockwise direction and the peak of cam 21 marked CP having likewise moved through 60° in counterclockwise direction. Pocket 1 has reached the position 0; pocket 2 is in midway position between tools 1 and 2; pocket 3 has just delivered a component into tool 3; tools 4 and 5 are being operated (tool 4 is closing while tool 5 is opening); pockets 4 and 5 are on the return path to tools 3 and 4; and pocket 6 is approaching tool 5.

Figures 6, 8:
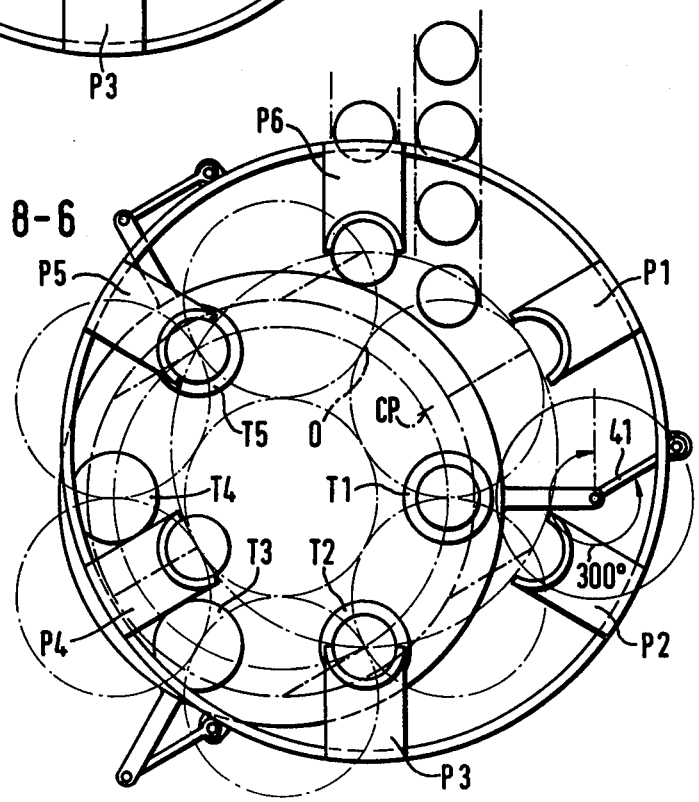

It will be seen from FIGS. 8-3 to 8-6, illustrating the mechanism at cycle angles of 120°, 180°, 240° and 300°, that the same pattern of movement takes place. At a cycle angle of 300° (FIG. 8-6) one completed component is delivered into the exit conveyor by pocket 6. The feed angle, i.e. the angle through which the crank 41 moves in order to transfer a component from one tool to the next following tool, is one third of the total cycle angle and is thus equal to 120°, and to accommodate physically this feed angle, the cam dwell angle is 180°.

Figure 9A:
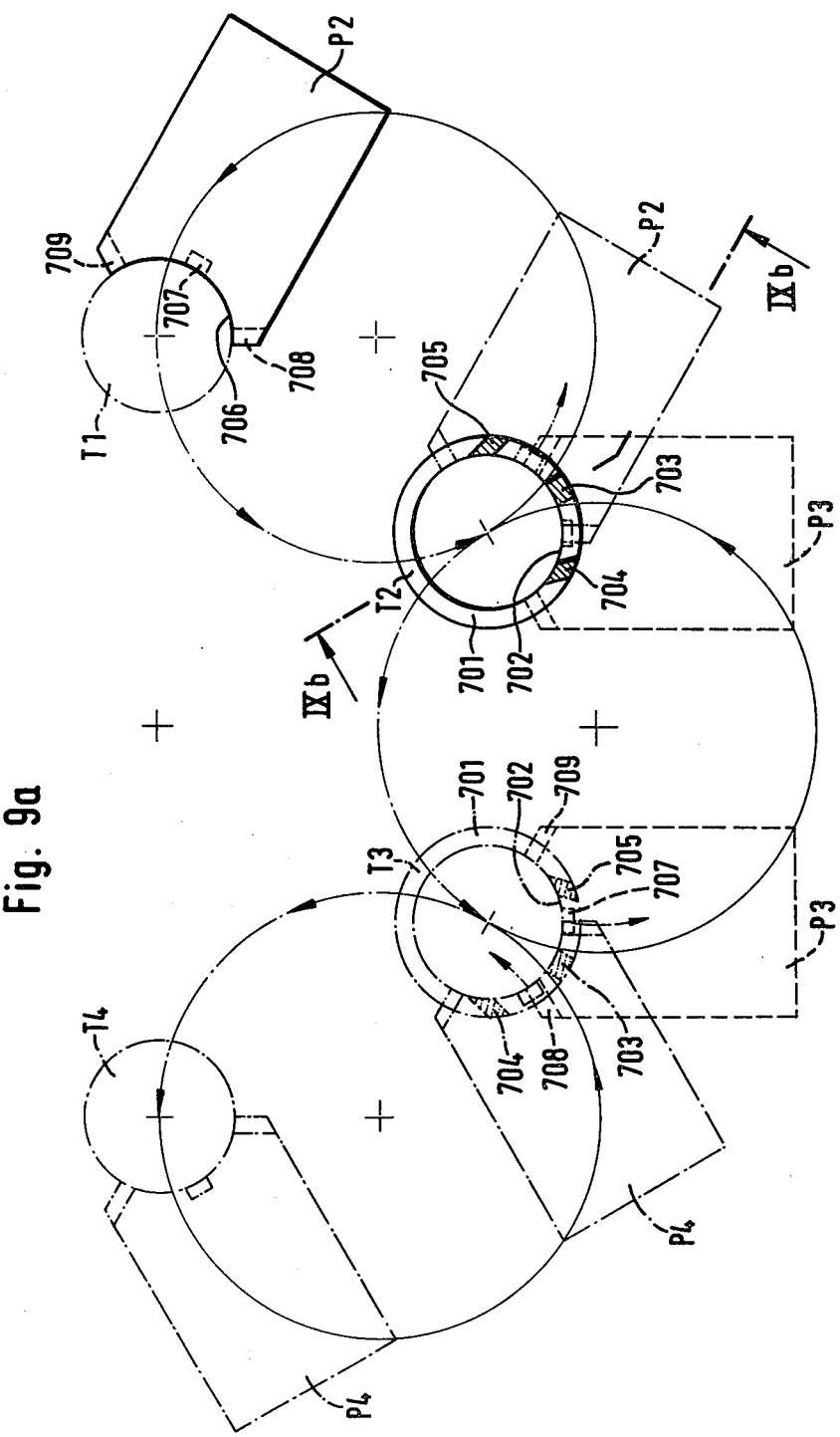
FIGS. 9a and 9b show the principle of interaction of certain components of the first transfer mechanism.
Figure 9B:
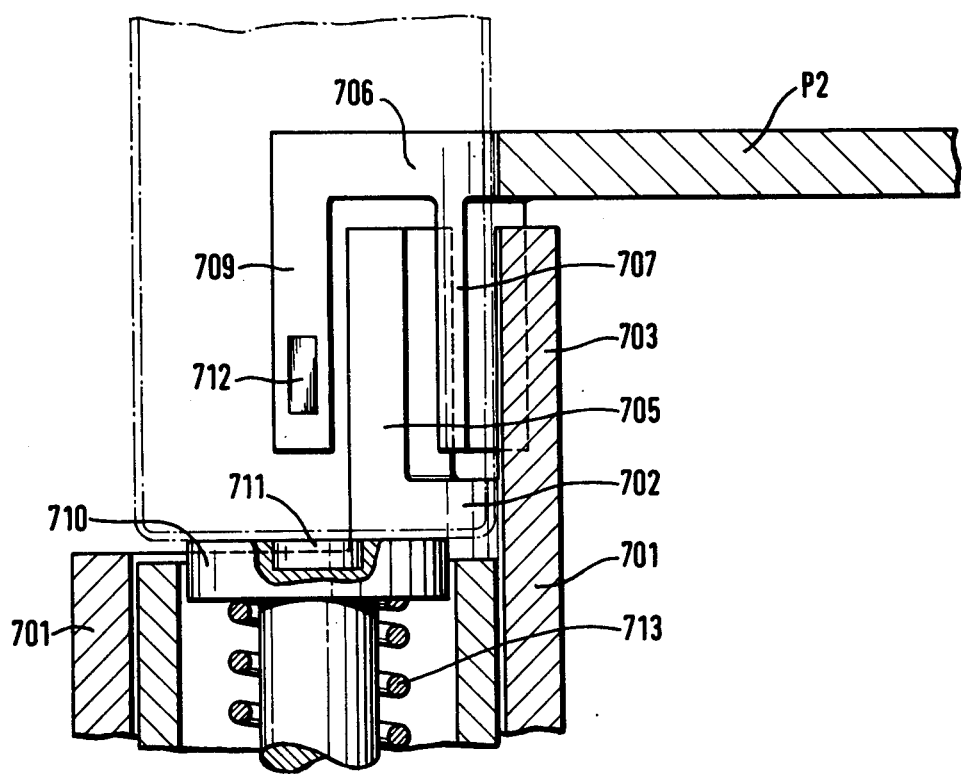

FIG. 9a shows the principle of interaction between the transfer pockets of the ring 43 and locating rings attached to the tools. Although it is known in the art to provide "nests" for locating components in the tools, in the transfer press according to the invention, additional features have been included to ensure complete control of the components during transfer and particularly at the instants of delivery and locating in the tools. For clarity FIG. 9a shows tools T2 and T3 diagrammatically as circles. These tools are being served by transfer pockets P2, P3 and P4, the pocket P2 being shown in greater detail in FIG. 9b. Each tool is embraced by locating ring 701. At one side each locating ring is provided with a locating surface 702, which is a segment of a cylindrical surface suitable to match the external surface of the component. The locating surface is extended by three prongs 703, 704 and 705, which protrude upwards. Prong 703 is positioned centrally in relation to the locating surface 702, while prongs 704 and 705 are located on the ends of the locating surface. Prongs 703, 704 and 705 are of a suitable width and have gaps therebetween. The length of the prongs is at least ¾ of the height of the component to be transferred. Transfer pocket P2 is in the form of a plate of suitable thickness to ensure adequate stiffness, and is provided with a nesting surface 706, which fits the surface of the component to be transferred, being in a form of a segment of cylinder extending through 120°. The nesting surface 706 is extended downwards by means of three prongs 707, 708 and 709. Positioned centrally is prong 707, with prongs 708 and 709 at the ends of the nesting surface and spaced from the prong 707. The length of prongs 707, 708 and 709 is similar to that of the prongs 703, 704 and 705. The gaps between prongs 707, 708 and 709 are wide enough to miss the die locating ring prongs 703, 704 and 705 while collecting the component from one tool and depositing it in the next tool.

The design of transfer pockets will vary depending on the proportions of the component. The general rule is, that the pocket must suit the conditions of the tool into which the component is to be deposited, since it is extremely important when the tool is closing on the component, that precise concentricity is maintained. After the forming operation, the component's diameter may be smaller and the cylindrical wall will not be contacting the nesting surface; it will however be concentric with the tool, having been pushed out of the die by a pad 710 urged by a spring 713 and kept in contact with the pad 710 by a magnet or vacuum device 711. In this case the nesting surface of the transfer pocket will fit the component, and the prongs of the transfer pocket will be suitably located to miss the prongs of the locating ring. The transfer pocket is provided with a magnetic device to retain the component in the pocket.

The minimum cam dwell angle Δ is related to the feed angle θ and the number N of tools by the following equation:

$$\Delta = \theta + 360/N$$

Figure 10:
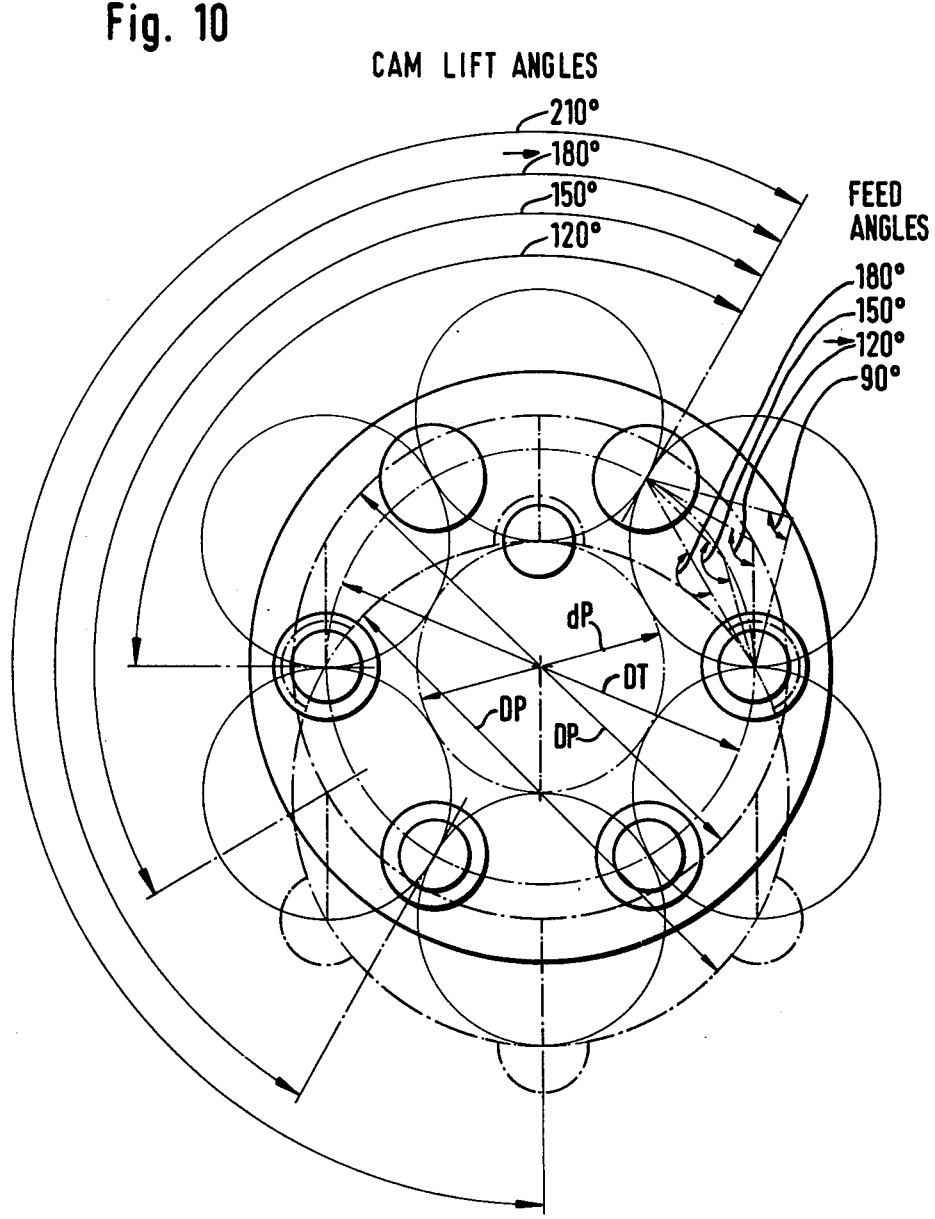
FIG. 10 illustrates diagrammatically the relationship between feed angle and cam lift angle.

FIG. 10 and the following Table clarify the relationship between the cam dwell angle, the feed angle and the number of tools. It has been assumed that the effective feed angle may vary between 90° and 180°, although at 180° feed angle, the dwell angle must be large, leaving little space for the cam lift. The particular example on FIG. 10 shows 120° feed angle, which leaves 180° for the lift of the cam, identical to that in the case of FIG. 8.

TABLE

| Effective Feed angle | No. of Tools | Cam dwell angle | Cam lift angle |
| --- | --- | --- | --- |
| 90° | 6 | 150° | 210° |
|  | 12 | 120° | 240° |
| 120° | 6 | 180° | 180° |
|  | 12 | 150° | 210° |
| 150° | 6 | 210° | 150° |

TABLE-continued

| Effective Feed angle | No. of Tools | Cam dwell angle | Cam lift angle |
|---|---|---|---|
| | 12 | 180° | 180° |
| 180° | 6 | 240° | 120° |
| | 12 | 210° | 150° |

The diameter dP of the transfer path is given by:

$$dP = DT \frac{\sin 180/N}{\sin \theta/2}$$

where DT is the diameter of the tool pitch circle, N is the number of stations and of transfer pockets and $\theta$ is the feeding angle.

The diameter DP of the transfer pocket pitch circle (and of the circle concentric with the tool pitch circle and upon which the centers of the transfer paths are positioned) is given by:

$$DP = DT \left[ \cos \frac{180}{N} + \frac{\sin 180/N}{\tan \theta/2} \right].$$

Figure 11:
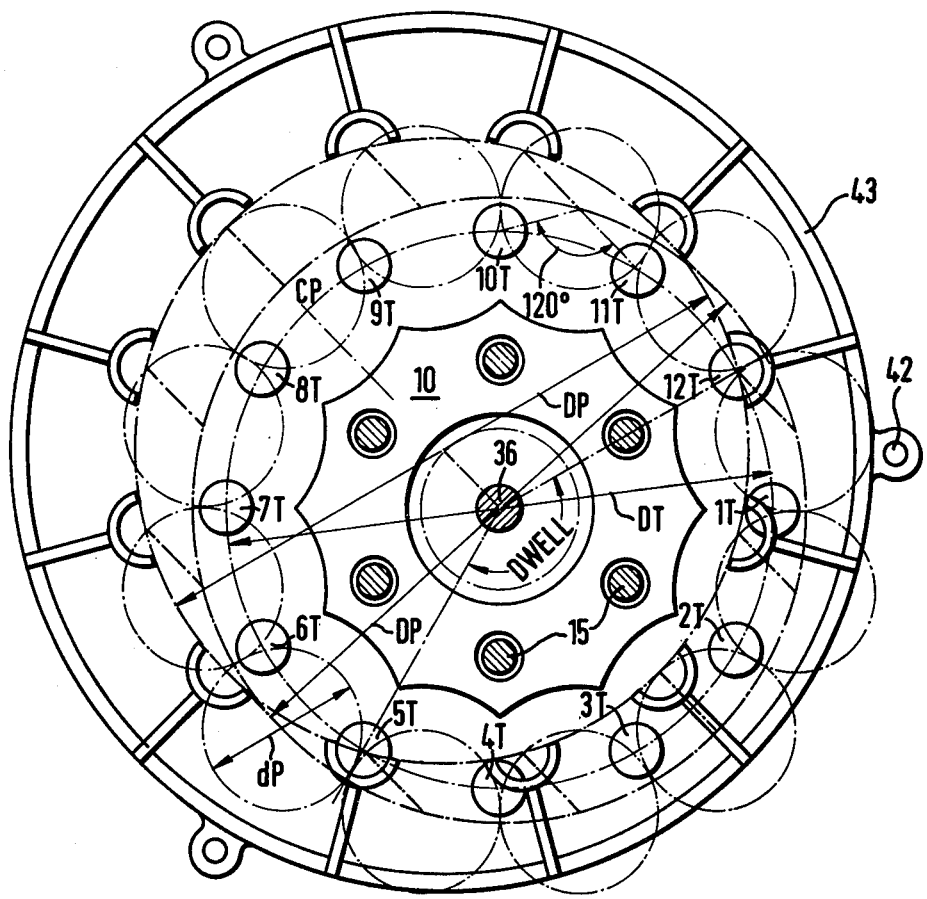
FIG. 11 shows a plan view of a modified transfer mechanism according to the invention.

FIG. 11 illustrates diagrammatically a twelve pocket transfer mechanism, which is the most likely and preferred solution for the rotary transfer mechanism according to the invention. It offers flexibility in application and minimum impact between the workpiece and handling elements. Above all it allows a sizeable center stern 10 of the press, the stern 10 being maintained in a state of compression by at least six tie bolts 15, which contribute to stiffness of the structure. Center stern 10 is embraced by transfer ring 43 supported on pivots 42. It carries twelve pockets, each of suitable size to fit the exact dimensions of the component after being operated upon by the tool from which it is collected by the pocket.

There are a number of possibilities with this set-up. For higher outputs one could employ two sets of tools. In such a case the material blanks would be delivered into first and seventh station, and components would be extracted from fifth and eleventh tool, leaving stations 6 and 12 idle.

Alernatively, by employing six tools only, an idle station could be provided between each pair of successive tools, offering the possibility of inspection after each operation. This may be achieved by providing at each idle station a component handling nest which is removable, and an exit chute comprising two guides (as shown in FIG. 8-6). The transfer pocket feeding a particular idle station deposits a partly manufactured component in the removable component handling nest and the nest is removed from the idle station by way of the exit chute. The component can then be inspected and the nest containing the component replaced at the idle station. The nest must be replaced within one period of the cycle of operation of the press, since otherwise the nest would not be available to receive the next component and the next component would accordingly be returned to the preceding station and crashed between the prongs of the nest at that station. Inspection would take place at regular intervals. Thus, it would be possible to inspect not only finished components but also partly manufactured components, and this is important when it is desired to meet particularly high quality standards. Further possibilities are contemplated. For example, the material might be supplied in short strip form or in continuous coil form, in which case the first pocket of the rotary transfer collects a cup or blank from a cupping/blanking tool, which does not require a component locating nest and which would be placed in the idle station 0 of FIG. 8, or at each of the idle stations 6 and 12 of the FIG. 11 arrangement employing two sets of tools. As finished components are ejected from the last tool, they would have to pass over the punch of the cupping tool. This is possible precisely because the latter tool is not provided with a nest.

The number of transfer pockets is primarily dictated by the capacity of the press, which requires suitable dimensions for the center stern 10. In particular, when the press is to be used for two-piece can making, or when an ironing operation is included the ram capacity at the early operations could be up to 12 tonnes. At one time for short periods, one has to assume for safety in design, that up to 3 tools could be developing the working loads, and the center stern must therefore be of sufficient diameter and provided with a suitable number of tie bolts 15, to resist safely 36 tonnes. Another important parameter, which influences the size of the press is the pitch between the tools, depending mainly on the size of the tools dictated by the component made.

Figure 12:
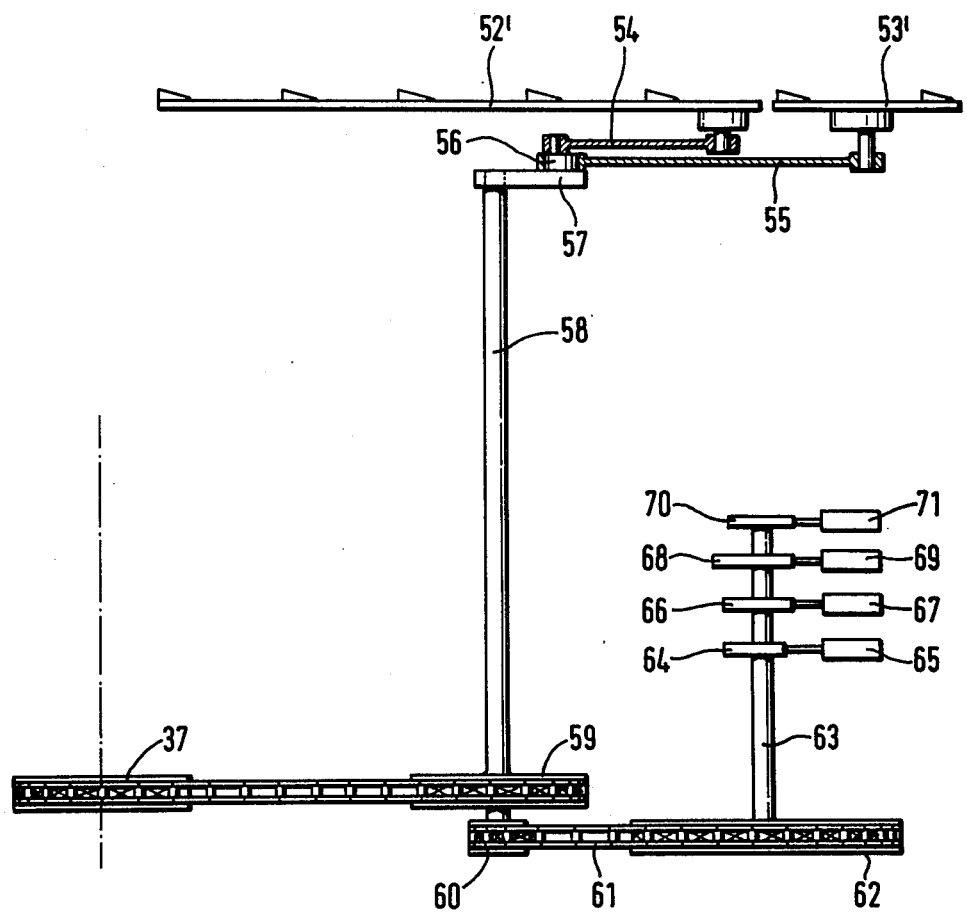
FIG. 12 is a side elevation and FIG. 13 is a plan view of a mechanism for feeding strip material to the transfer press.
Figure 13:
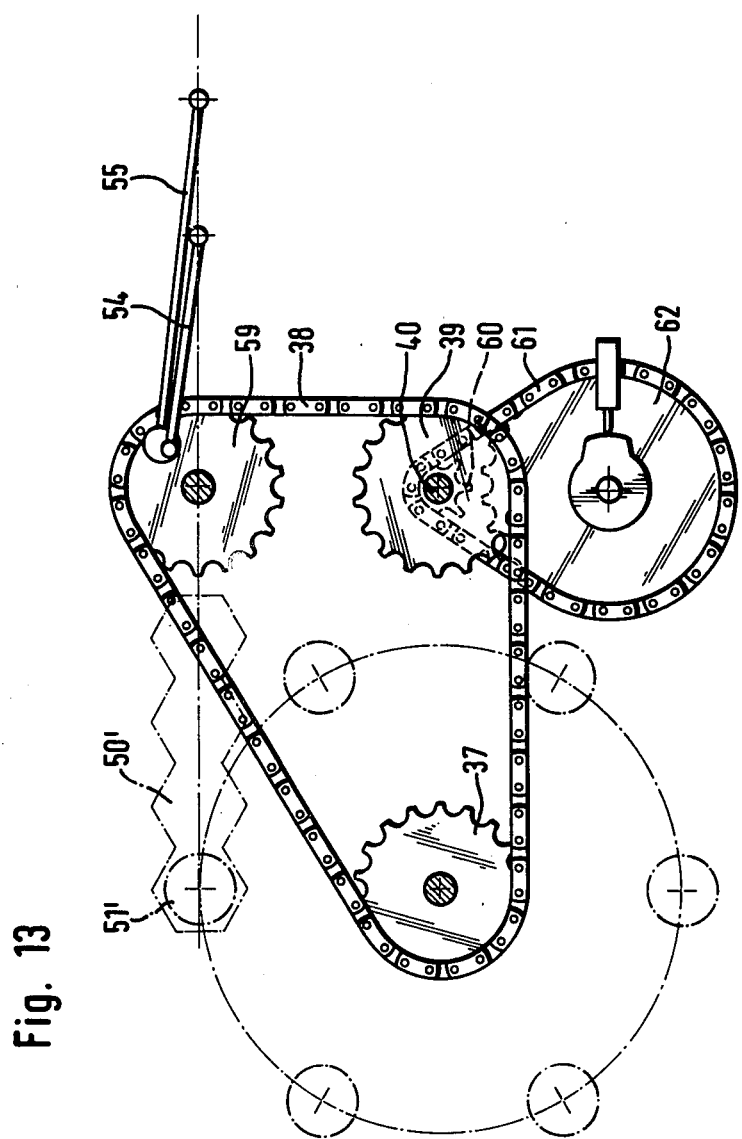

FIGS. 12 and 13 show diagrammatically the application of the strip-feeding to the press according to the invention. The purpose is to feed strip 50 to the cupping tool 51 located at the idle station 0 of FIG. 8. This is achieved in a manner well known in the art by feed bar 52 and auxiliary feed bar 53, to which the strip 50 is supplied from the stack of strips (not shown) by mechanisms (not shown). Feed bars 52 and 53 are reciprocated by connecting rods 54 and 55 driven by a double eccentric 56, attached to crank 57 at the end of drive shaft 58. The double eccentric 56 is adjustable along crank 57 to ensure that the feed bars can be actuated at different strokes. It will be seen, that the auxiliary feed bar has a longer stroke. Crankshaft 58 has a driving sprocket 59 which is wrapped by chain 38 (FIG. 13) taking the movement from driving sprocket 37, which also drives sprockets 39 and crankshaft 40 (FIG. 5).

Handling of the strip is effected by means of pneumatic devices (not shown), but the steering mechanism for controlling operation of the pneumatic devices has been illustrated on FIGS. 12 and 13. The steering mechanism may take drive from any cyclic shaft for example shaft 40 to which driving sprocket 60 is attached actuating chain 61 wrapped also around sprocket 62. The ratio of teeth in sprockets 62 and 61 represents the number n of blanks in strip 50. Thus, while each revolution of the sprocket 59, and hence of the sprocket 60, is associated with advancing the strip by one blank, n revolutions of the sprockets 59 and 60 are required in order to rotate the sprocket 62 through one revolution. Sprocket 62 drives steering shaft 63, to which a number of steering cams are keyed, each cam operating suitable pneumatic valves. The pneumatic valves provide instructions for pneumatic cylinders (not shown) which operate the strip handling mechanisms, before the strip reaches the auxiliary feed bar position.

Hence cam 64 operates valve 65 controlling the movement of the vacuum sucker mechanism. Cam 66 operates valve 67 controlling the movement of the translator mechanism, which shifts the strip 50 sideways into the path of auxiliary feed bar 53. Cam 68 operates valve 69 controlling the scrap ejecting rolls. Cam 70 operates valve 71, which controls the vacuum admission into the suckers. The arrangement shown in FIGS. 12 and 13 and described above is one of many which could be employed as a strip feeder to the press according to the invention.

Figure 14:
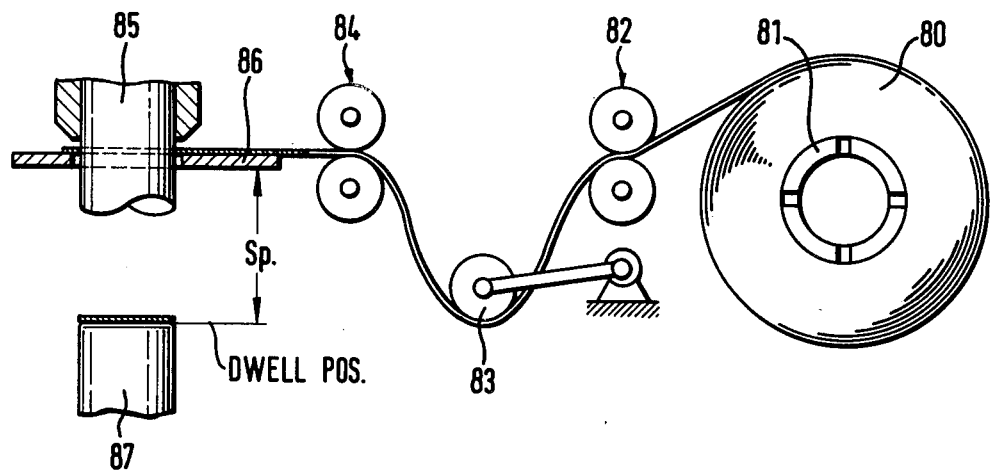
FIG. 14 is a diagrammatic side elevation of a mechanism for feeding coil material to the transfer press.
Figure 15:
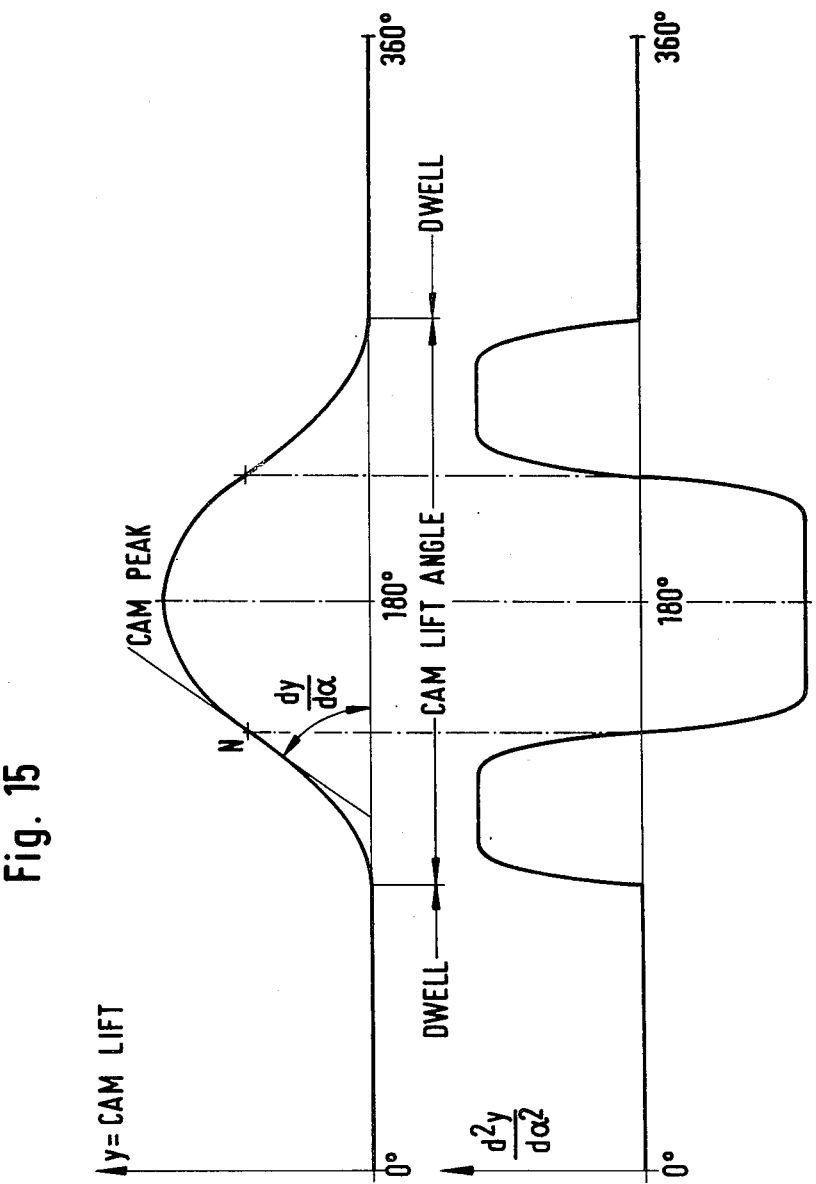
FIG. 15 shows graphically the cam profile and the second derivative of the cam profile.

FIG. 14 shows diagrammatically a coil feed mechanism. Narrow strip 80 is mounted on expanding mandrel 81. Pinch rolls 82 pull strip 80 and thus rotate the mandrel 81. The rotation of pinch rolls 82 is controlled by "dancer" roll 83, which is provided with a switch (not shown) to switch "on" and "off" the motor (not shown) driving pinch rolls 82. Another set of pinch rolls 84 driven intermittently from the press through a suitable stop and move mechanism such as a Maltese cross mechanism (not shown) feeds strip 80 into the cupping tool 85 which is identical to cupping tool 51 in FIG. 13. Strip 80 is guided by stripper plate 86. As shown in FIG. 14, when the punch 87 is in its lower dwell position, it leaves space between its top face and the stripper plate 86, for the rotary transfer pocket ejecting the finished component from the press through the idle station 0, as explained previously. FIG. 15 shows diagrammatically the profile of the actuating cam 21. As discussed previously and illustrated in FIG. 10, the value of the cam lift angle depends on the transfer feed angle and the number of stations. The most likely and preferred value of the cam lift angle will be between 180° and 240°. The lift of the cam depends on the height of container and the type of the tools employed. It may be equal to three times the height of the finished container before trimming. The cam shape or profile has a constraint in the form of the maximum incline angle at the nodal point N, where normally acceleration changes to deceleration: at that point $dy/d\alpha$ must not be greater than tangent 30° for smooth operation. This constraint dictates also the size condition for the cam 21, the diameter of which may have to be increased in order to decrease the slope of the cam at the nodal point N. In addition the cam lift angle must also be kept to maximum possible value. If the acceleration curve is similar to that shown in FIG. 15, the slope of the cam at point N will be kept to minimum.

The design and features of cam 21 are an important point of the press according to the invention. It allows the arrangement of the tool array along a circular path, and successive actuation of the tools. It leaves a suitable fraction of the cycle time available for feeding by the rotary transfer arrangement, which performs at constant velocity and does not require intricate intermittently operated mechanisms.

Figure 16:
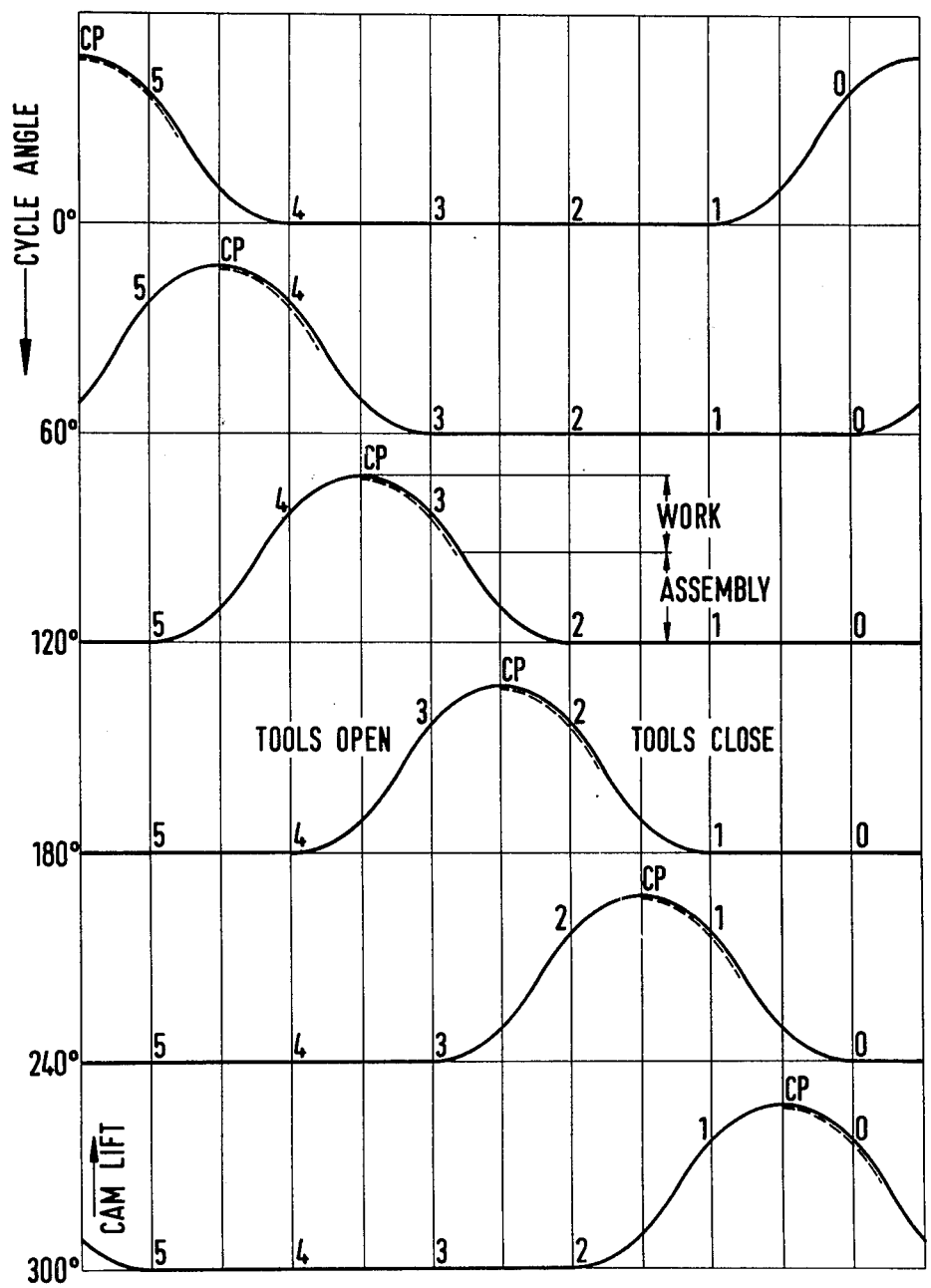
FIG. 16 shows the cam lift relative to the tools at various cycle angles.

In order to explain clearly the relationship between the cam and tool positions as progressively shown in FIG. 8, reference will now be made to FIG. 16, from which it can be seen that at zero cycle angle the cam peak CP is between idle position zero and tool position 5. At 60° cycle angle CP is between tool positions 4 and 5, and at subsequent cycle angles 120°, 180°, 240° and 300°, CP is between positions 3 and 4, 2 and 3, 1 and 2, 0 and 1 respectively. Only a certain part of the cam rise near CP performs the "working" lift, the remainder serving an assembly function, i.e. closing the tool, component and die together without deforming the component. FIG. 16 illustrates clearly, that with the tools spaced apart angularly by 60° (i.e. with five tool positions and one idle position), one tool at a time will perform useful work. This is desirable for two principal reasons. First, it is essential that the component be centered accurately on the die, so that the punch may enter it. In the case of FIG. 1, there is at any one time more than one tool developing a working load, and this results in deflection of the structure 101 which may interfere with precise entry of the punch into the component. FIG. 16 shows that during assembly of the component onto the punch, the press is not loaded and accordingly the relationship between the punch and die is not affected by other tools. Second, if more than one tool performs useful work at a time, as in the case of FIG. 1, there may be an interaction between the tools resulting from the deflection which has to be compensated for, e.g. by setting some tools eccentrically to compensate for lateral deflection. In addition, power requirements are minimized. The number of tools could be increased and the working lift of the cam rise would still operate on only one tool at a time, which is beneficial for the reasons explained, and also with regard to the press frame load magnitude. The dwell and lift angles shown in FIG. 16 are equal and reference may be made to FIG. 10 for further details.

Figure 17:
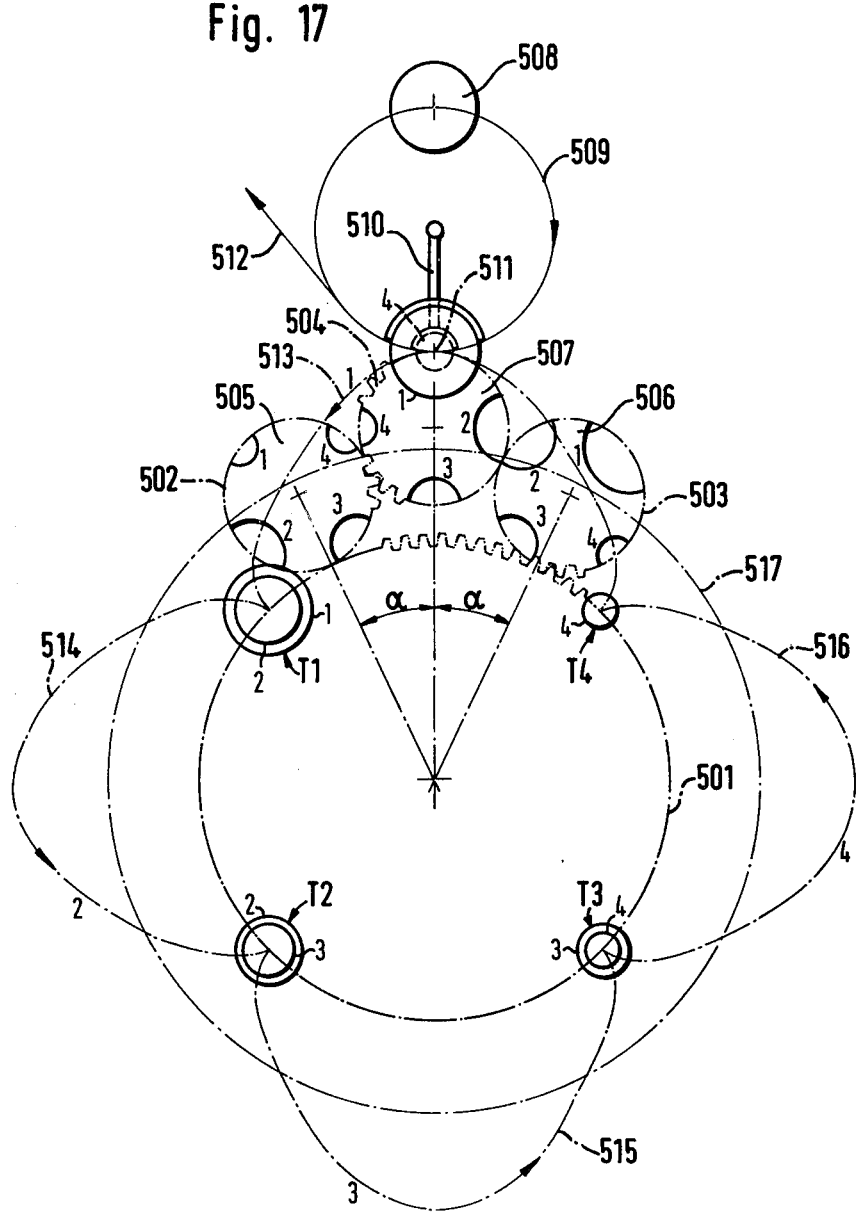
FIG. 17 is a diagrammatic plan view of a second transfer mechanism according to the invention.
Figure 18:
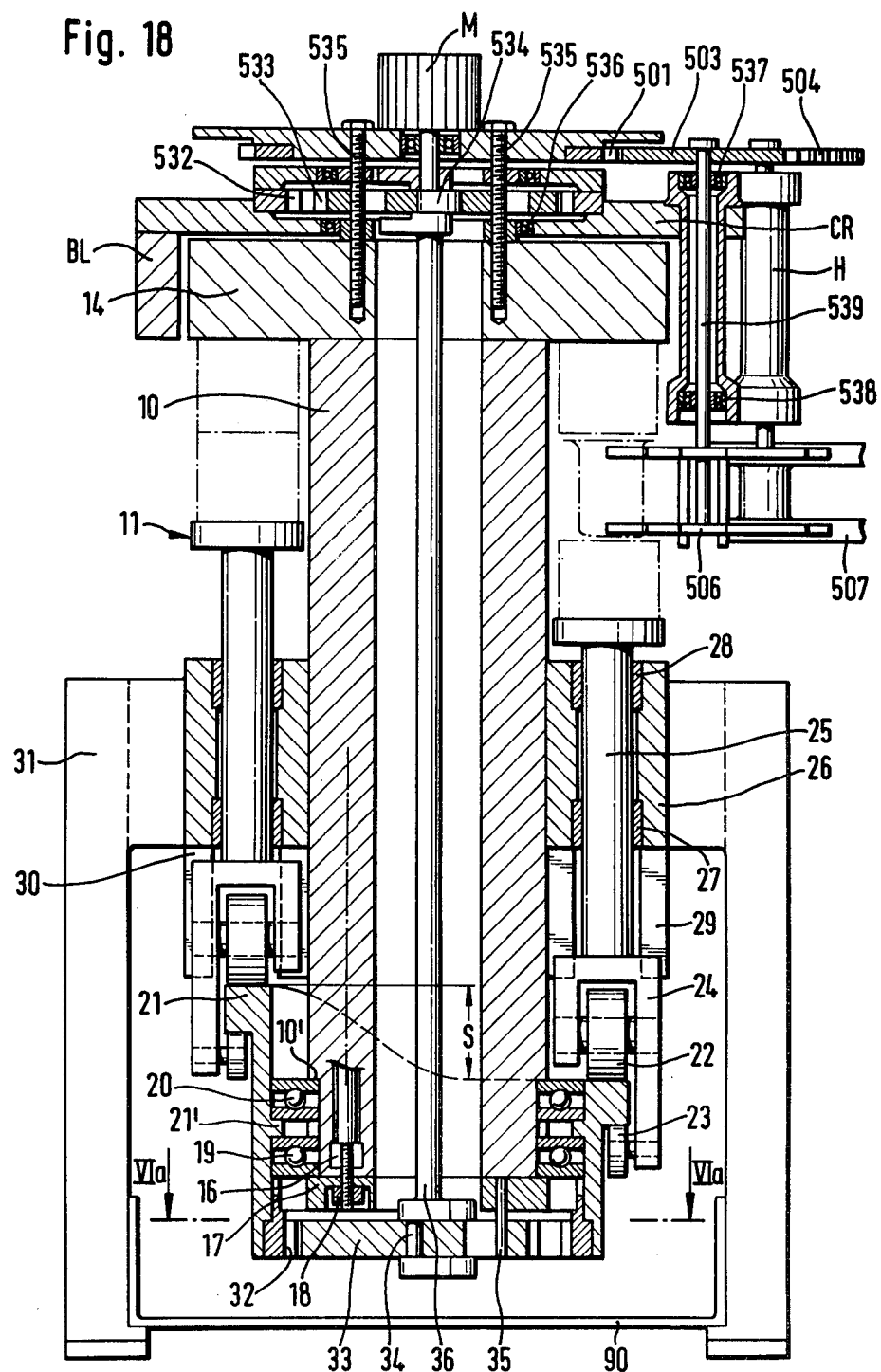
FIG. 18 is a side view, partly in elevation and partly in section, of a press equipped with the second transfer mechanism.
Figure 19A:
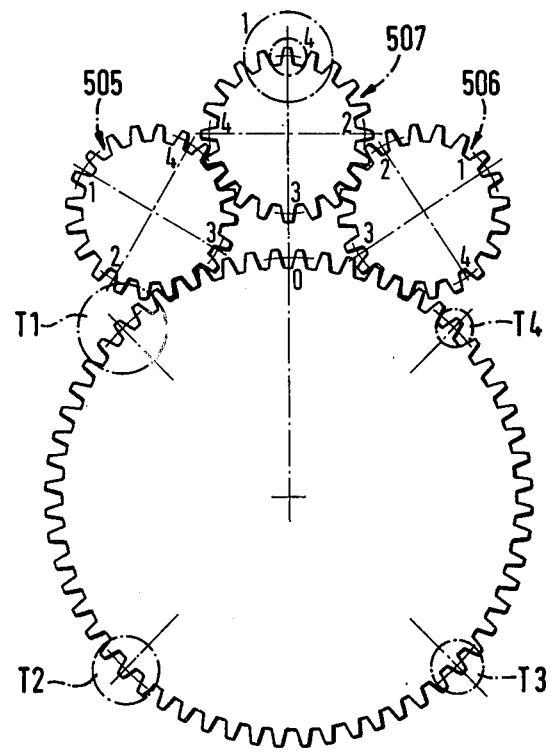
FIGS. 19a–19i show in simplified form nine successive operating positions of the second transfer system.
Figure 19B:
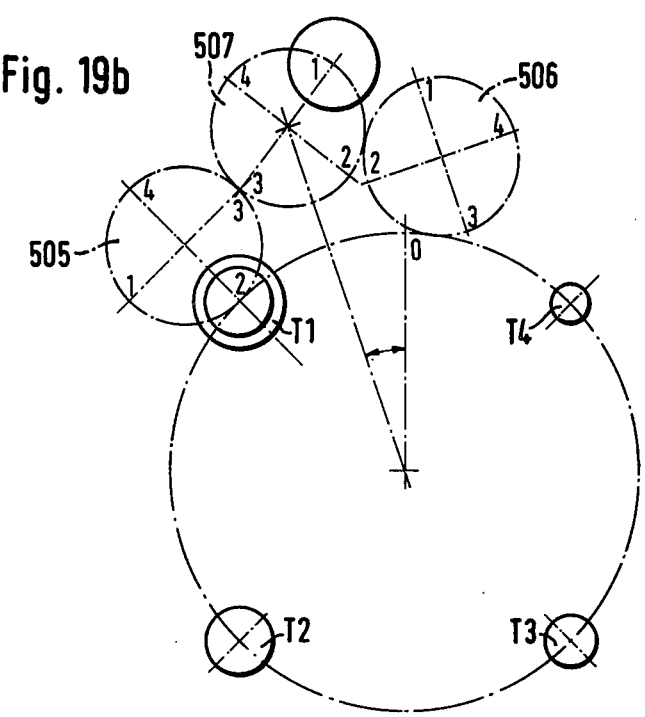
Figure 19C:
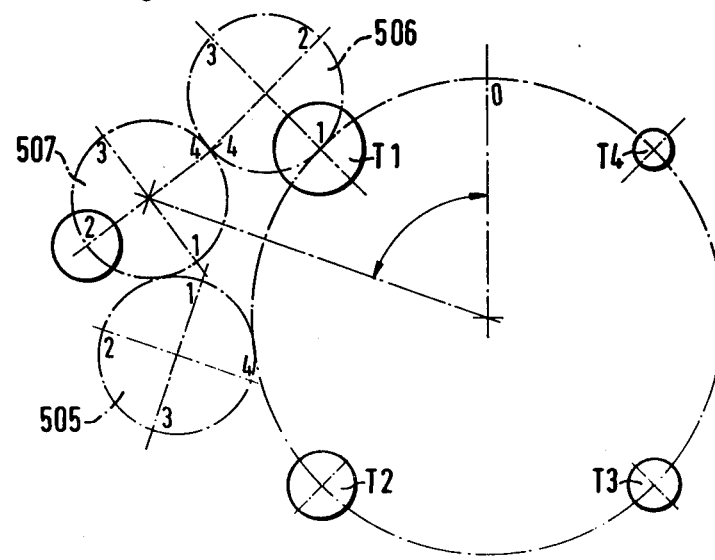
Figure 19D:
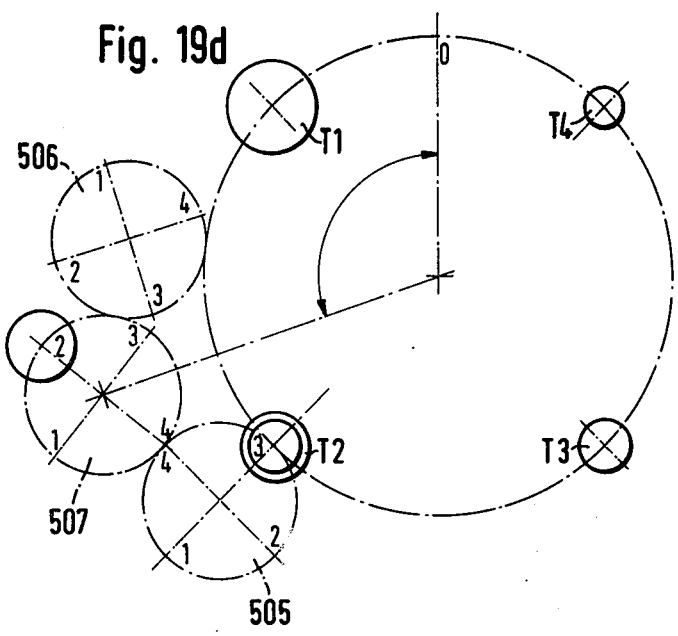
Figure 19E:
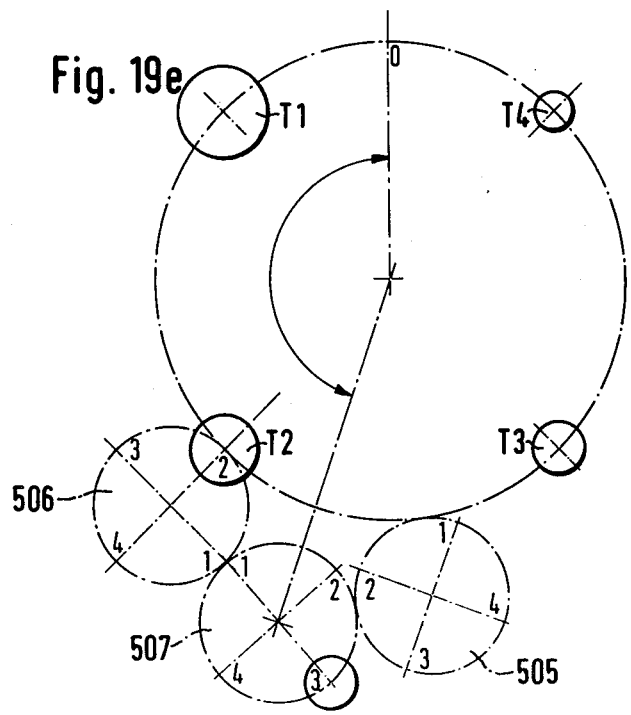
Figure 19F:
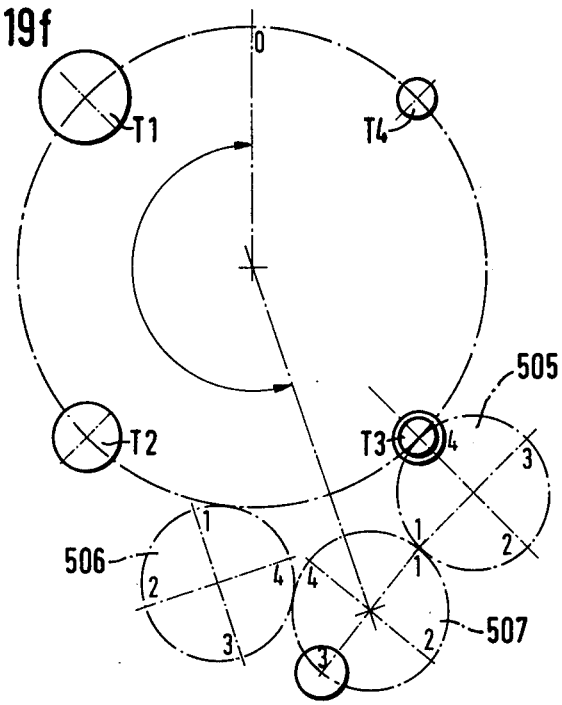
Figure 19G:
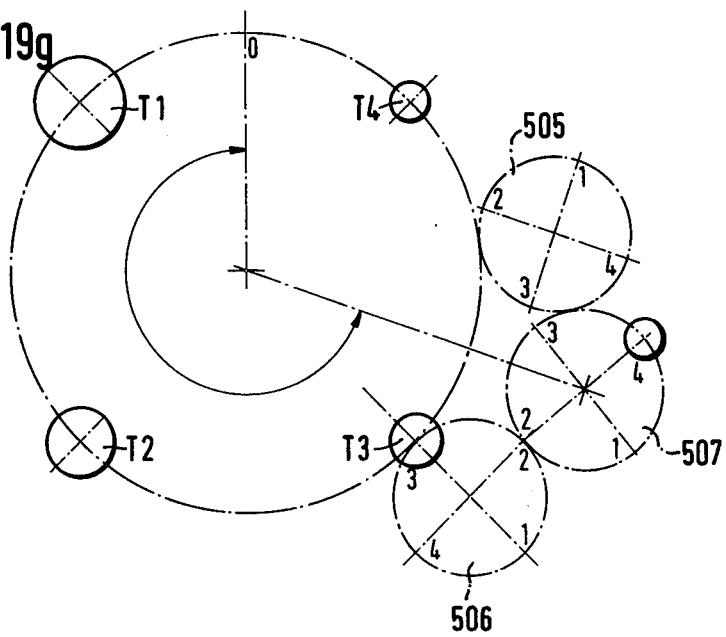
Figure 19H:
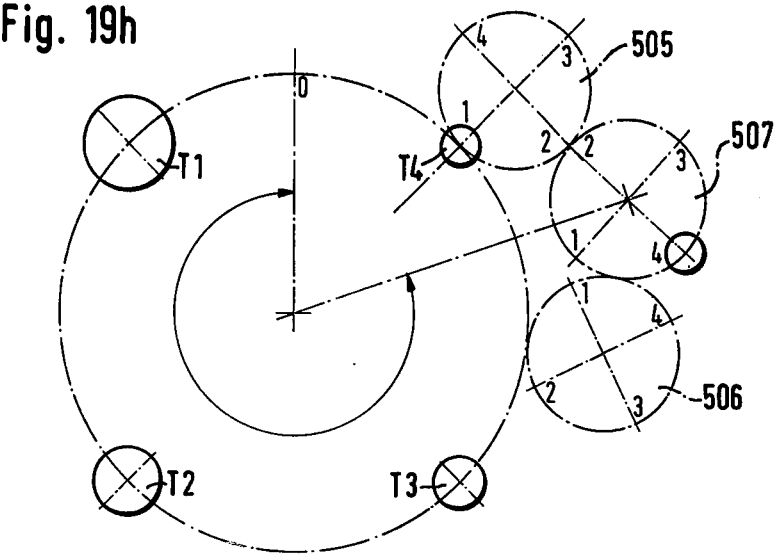
Figure 19I:
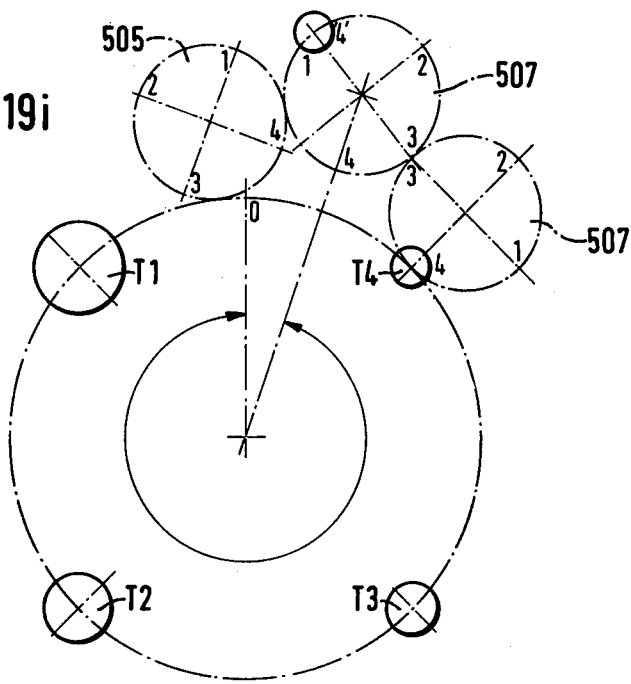
Figure 20A:
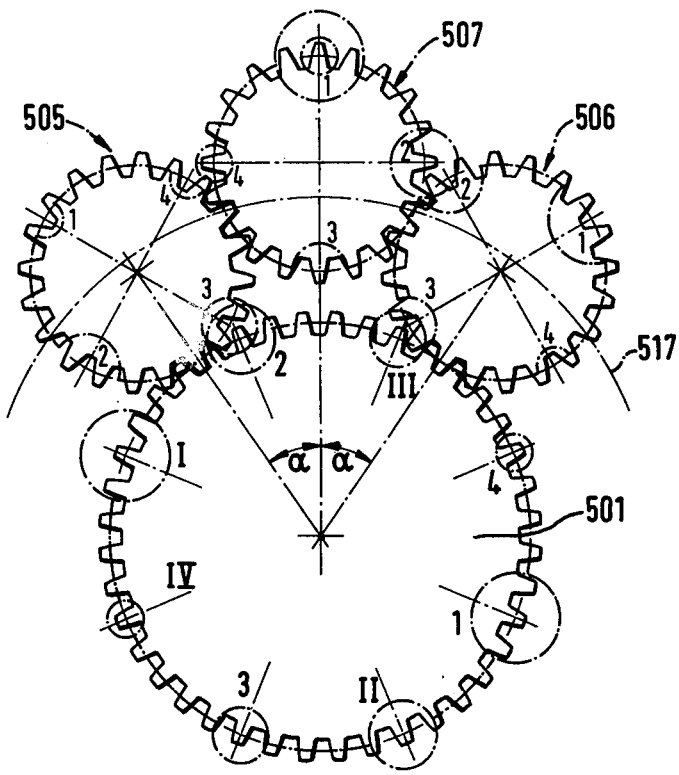
FIGS. 20a–20i show in simplified form nine successive positions over one half of the cycle of the second transfer system operating with a press having two sets of four tools.
Figure 20B:
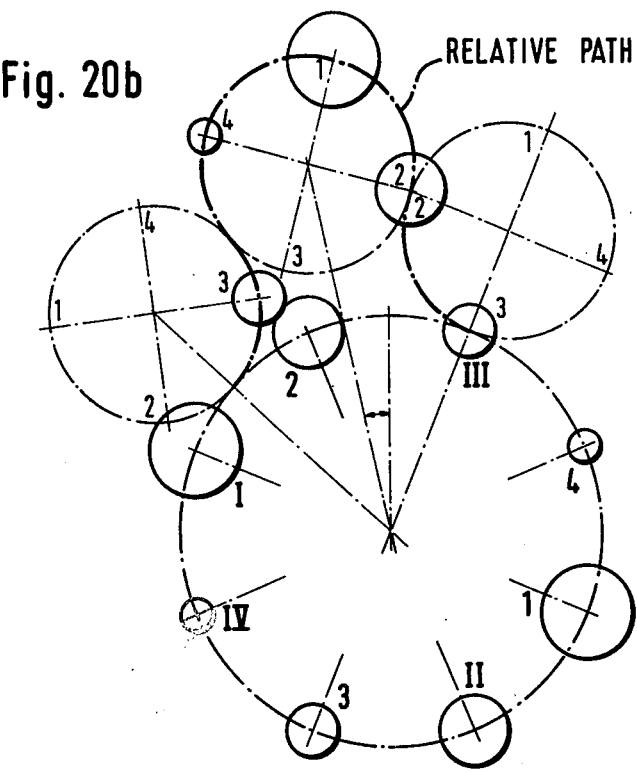
Figure 20C:
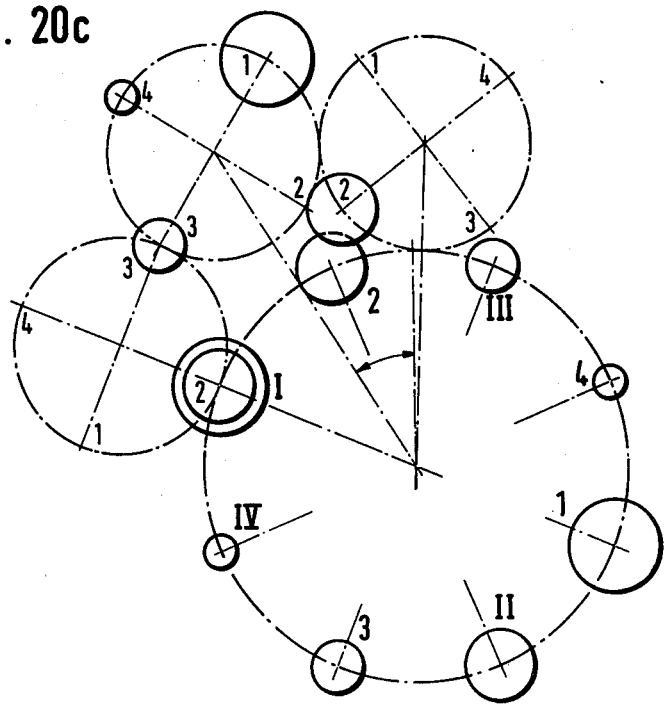
Figure 20D:
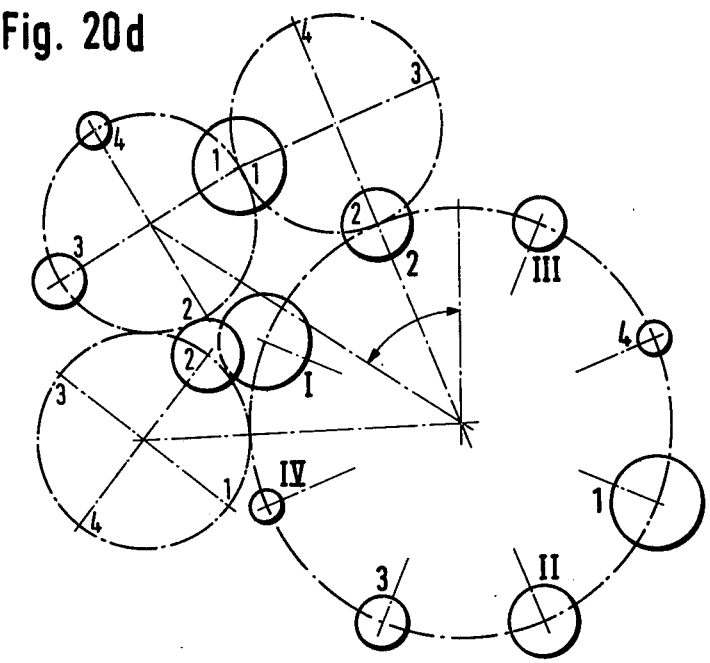
Figure 20E:
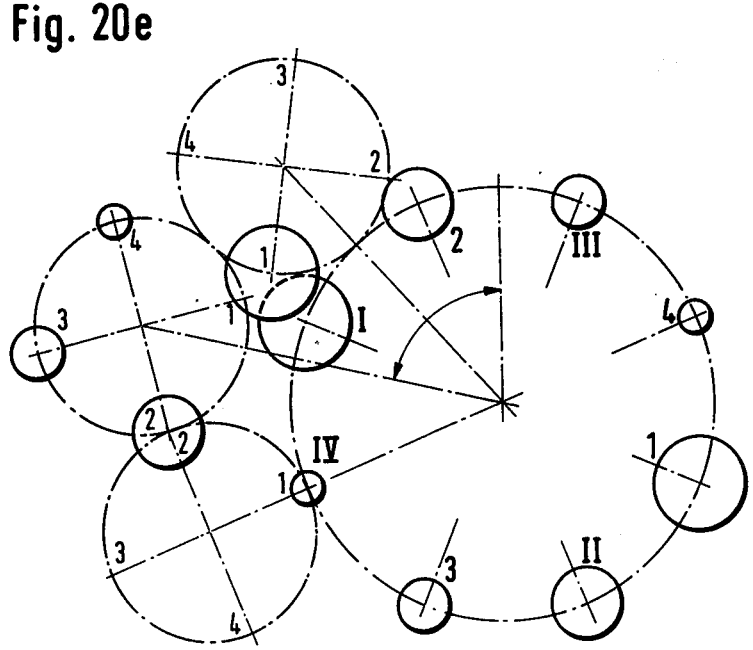
Figure 20F:
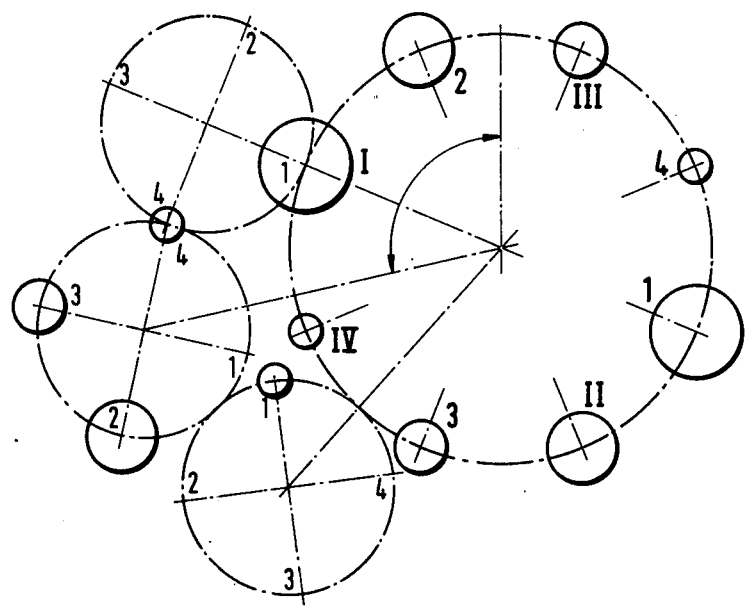
Figure 20G:
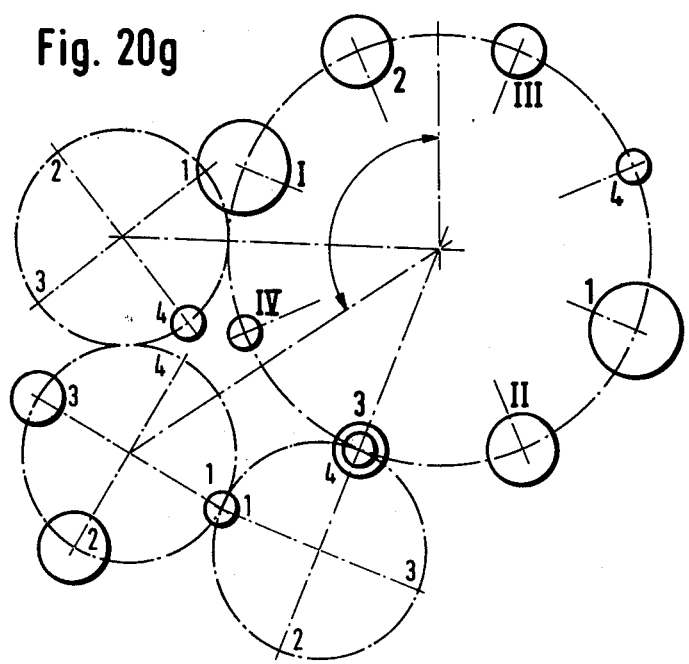
Figure 20H:
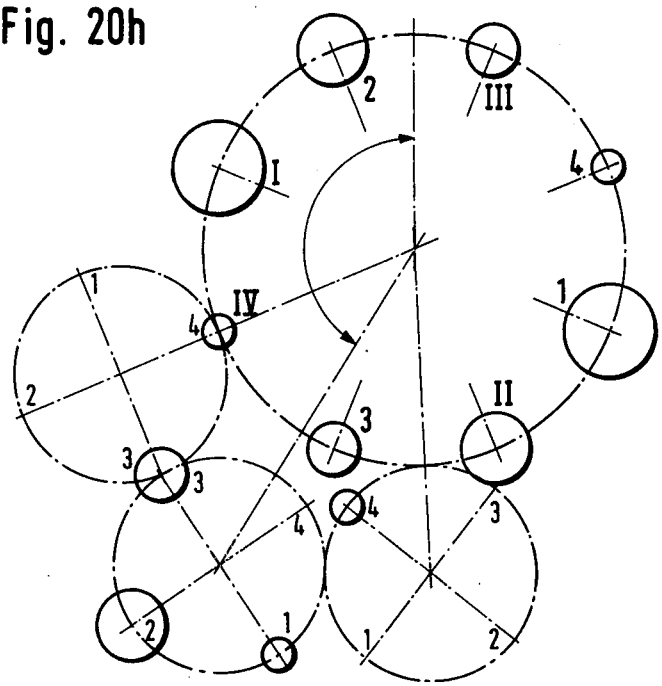
Figure 20I:
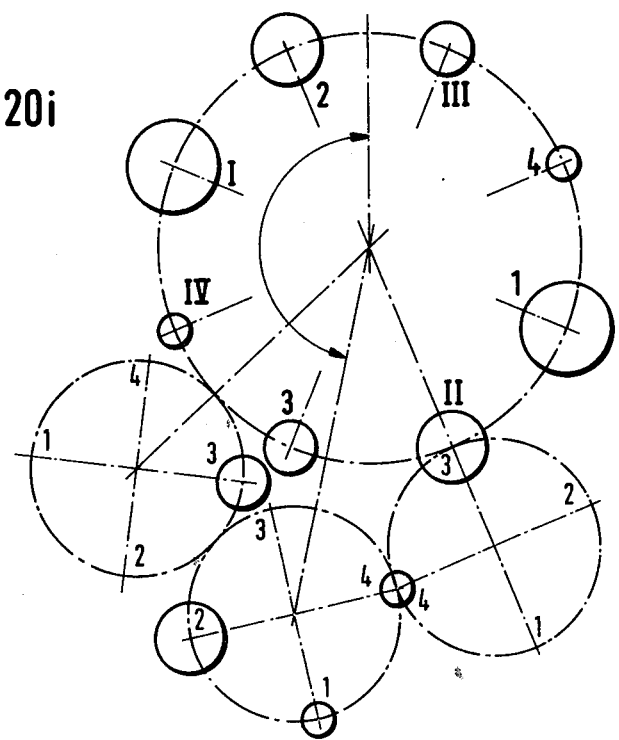

For high speed applications, for example manufacture of two-piece cans by DrD method, and epicycloidal handling system, as illustrated in FIGS. 17 and 18, is suitable. In this case there are four tools T1, T2, T3, T4 positioned along a circle which coincides with the pitch circle of a stationary gear 501 which is mounted on the bolster 14 (FIG. 18) by means of tie bolts 535. A carrier ring CR is mounted by means of a bearing 536 to rotate about the axis of the crankshaft 36. A reduction gear comprising elements 532, 533, 534 and 535 (corresponding to the elements 32, 33, 34 and 35 of FIG. 6b) transmits drive from the motor M to the carrier ring CR, and thus causes the ring CR to rotate about the center stern 10 at the same speed as the cam 21.

The carrier ring CR carries three turret housings H, of which only two can be seen in FIG. 18. Each turret housing H is hollow and has a shaft 539 extending axially therethrough, mounted in bearings 537,538. Three turrets 505, 506 and 507 are mounted on the lower ends of the shafts respectively, and three gears 502, 503 and 504 are keyed to the shafts respectively at their upper ends. The gears 502 and 503 mesh with the gear 501 while the gear 504 meshes with the gears 502 and 503, as shown in FIG. 17. The angular relationship $\alpha$ between gear centers 502 and 504, also 503 and 504 is 25.87°. While gear 501 is stationary, the three gear set 502, 503 and 504 and the three turrets 505, 506 and 507 gyrate counterclockwise and the turrets themselves rotate about their own axes, driven by the respective gears. The mass of the turrets is balanced by a balance member BL on the opposite side of the carrier ring CR from the turrets.

Each turret has four pockets 1, 2, 3 and 4, which match exactly the diameters of components at the four stages of manufacture. The turrets are arranged so that a given pocket of the entry turret 506 deposits a component into the tool of corresponding diameter. Thus, a component enters the tool T1 from the pocket 1 of turret 506 with diameter 1 and after reduction to diameter 2 it is collected by pocket 2 of extract turret 505 and transferred via pocket 2 in transfer turret 507 to pocket 2 of entry turret 506, which deposits it into tool T2. After reduction to diameter 3 in tool T2, the component is collected from tool T2 by pocket 3 of extract turret 505 and deposited by pocket 3 of entry turret 506 in tool T3. After reduction to diameter 4 in tool T3, the component is collected from tool T3 by pocket 4 of extract turret 505 and deposited by pocket 4 of entry turret in tool T4. Finally, after trimming, without diameter reduction, in tool T4, the component is collected by pocket 1 of extract turret 505 (which pocket is the same size as pocket 4 of turret 505) and is discharged from pocket 1 of transfer turret 507.

One blank at a time is separated from stack of blanks 508 and transported along a circular blank transfer path 509 by rotary pocket 510 provided with a suitable nest to fit diameter 1 and also another nest underneath to fit diameter 4. Rotary pocket 510 deposits blank 1 in transfer turret 507 at point 511, and also extracts a component of diameter 4 from transfer turret 507 and places it on the exit conveyor 512. From point 511 the blank 1 travels to tool T1 along path 513. From tool T1 to T2 the components of diameter 2 travels along path 514. From T2 to T3 the component of diameter 3 moves along path 515. From T3 to T4 the component of diameter 4 moves along path 516. From T4 to point 511 the component of diameter 4 travels along the first half of path 513. It should be noted, that the components are handled between the pitch circle of gear 501 and limit circle 517 by extract turret 505 and by entry turret 506. Outside limit circle 517 components are handled by transfer turret 507. In this particular arrangement the ratio of the pitch diameter of gear 501 to the pitch diameter of gears 502, 503 and 504 is 3:1.

FIG. 19 illustrates the progressive positions of the epicycloidal handling systems and components in relation to tools at characteristic intervals. FIG. 19a shows the starting position with blank 1 collected by transfer turret 507 and component of diameter 4 ejected from turret 507. In FIG. 19b, pocket 2 of extract turret 505 makes contact with component of diameter 2 in tool T1. Between FIGS. 19b and 19c blank 1 is transferred into entry turret 506 approaching tool T1, while component of diameter 2 is moving away from tool T1 in extract turret 505. In FIG. 19c blank 1 is placed in T1, whereas component of diameter 2 is moved into transfer turret 507. Between FIGS. 19c and 19d it would be noted that the center line of transfer turret 507 has moved through 90° and component of diameter 2 has assumed the extreme position in turret 507, corresponding to the position of blank 1 in FIG. 19a. It follows that at in FIGS. 19d and 19e extraction of component of diameter 3 from T2 by extract turret 505 takes place followed by deposition of a fresh component of diameter 2 in tool T2 by turret 506. Between FIGS. 19e and 19f extract turret has moved through 180° and has component of diameter 3 in the extreme position. In FIGS. 19f and 19g the process of extracting component of diameter 4 from tool T3 and depositing a fresh component of diameter 3 in tool T3 takes place. Between FIGS. 19g and 19h the extract turret 507 has moved through 270° and component of diameter 4 is in the extreme position. FIGS. 19h to 19i illustrate unloading of tool T4 by pocket 1 of extract turret 505 removing component of diameter 4, followed by loading of a fresh component of diameter 4 from the pocket 4 of entry turret 506. It will be appreciated that the turrets 505 and 506 handle the components into and out of the tools without any impact. Hence, the epicycloidal handling system is suitable for high speed use. It will also be appreciated that once a pocket in any of the three turrets has been designated to handle the component during a certain phase of manufacture, it always does so.

FIG. 20 illustrates progressive positions of a single epicycloidal handling system for two sets of four tools. There is a similarity to the case illustrated in FIG. 19, in as much as there are three intergeared handling turrets, but the relative angle $\alpha$ between them is 35°. Also the ratio of pitch diameters of tools to turrets is 2:1. The extract turret 505 and the entry turret 506 handle the components between pitch circle of gear 501 and limit circle 517, while the transfer turret 507 handles components outside the limit circle 517. By examining the nine positions shown at FIGS. 20a to 20i over half a cycle, it can be seen that these positions are repeated in the second half of the cycle. At position 20a blanks are placed into the system and finished components are extracted as shown clearly in FIG. 21. Hence there are two blank supplies and two finished components extracts, which follows of course from there being two sets of tools available. Hence for one revolution of the press and handling system, two components are completed. It should be noted that both in FIG. 19 and in FIG. 20 the cam dwell is equal to $2\alpha$, hence 52° and 70° respectively.

Figure 21:
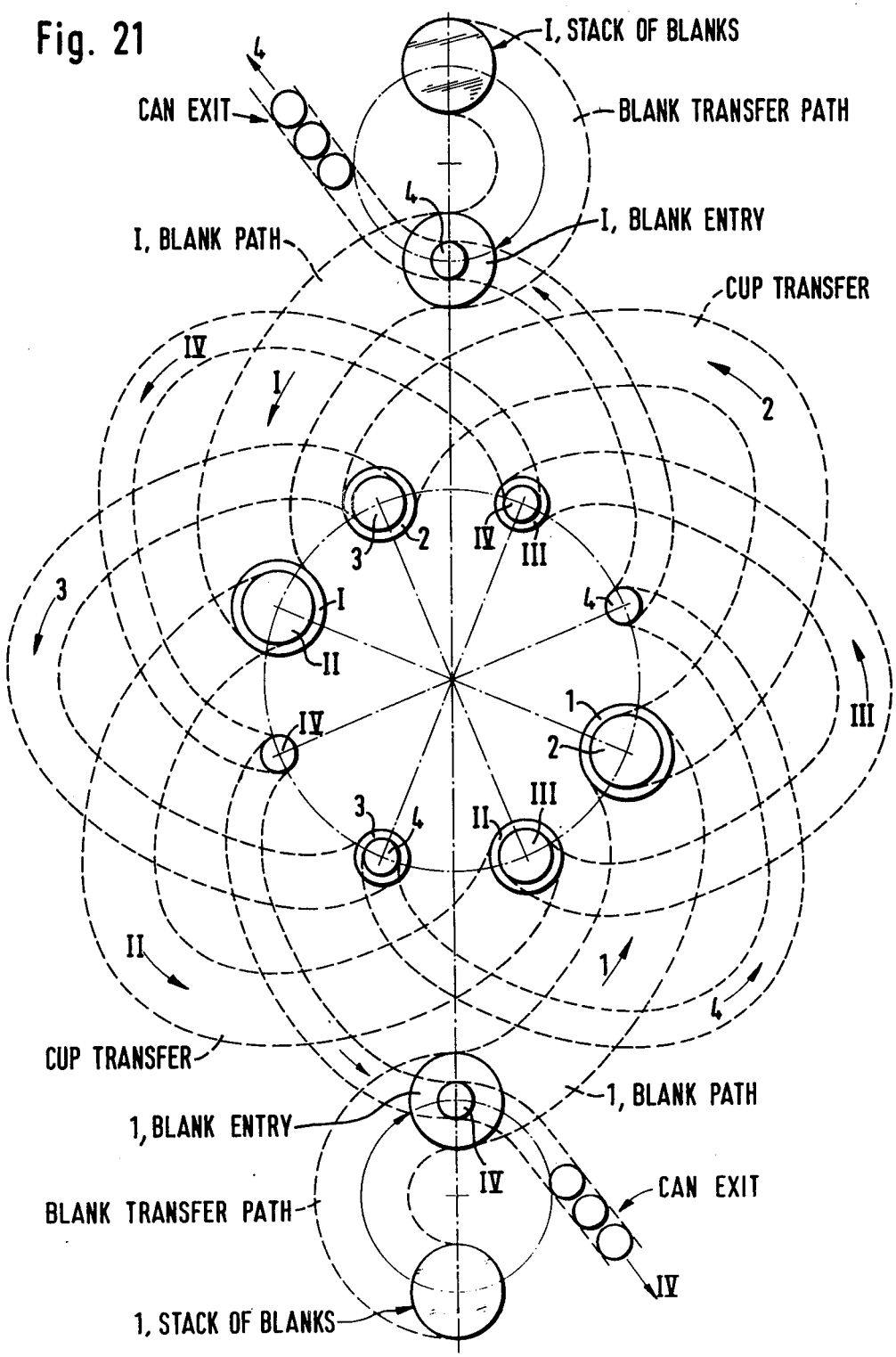
FIG. 21 is a line diagram of component paths between operations in a press according to the invention fitted with two sets of four tools and the second transfer mechanism.

FIG. 21 illustrates the paths of components between operations for the epicycloidal handling system with two sets of tools and two blank feeding arrangements. It is evident that the blank after entering the handling system travels over 1.5 revolutions, hence the finished component leaves through the opposite entry/exit station from that at which the original blank entered.

Figure 22:
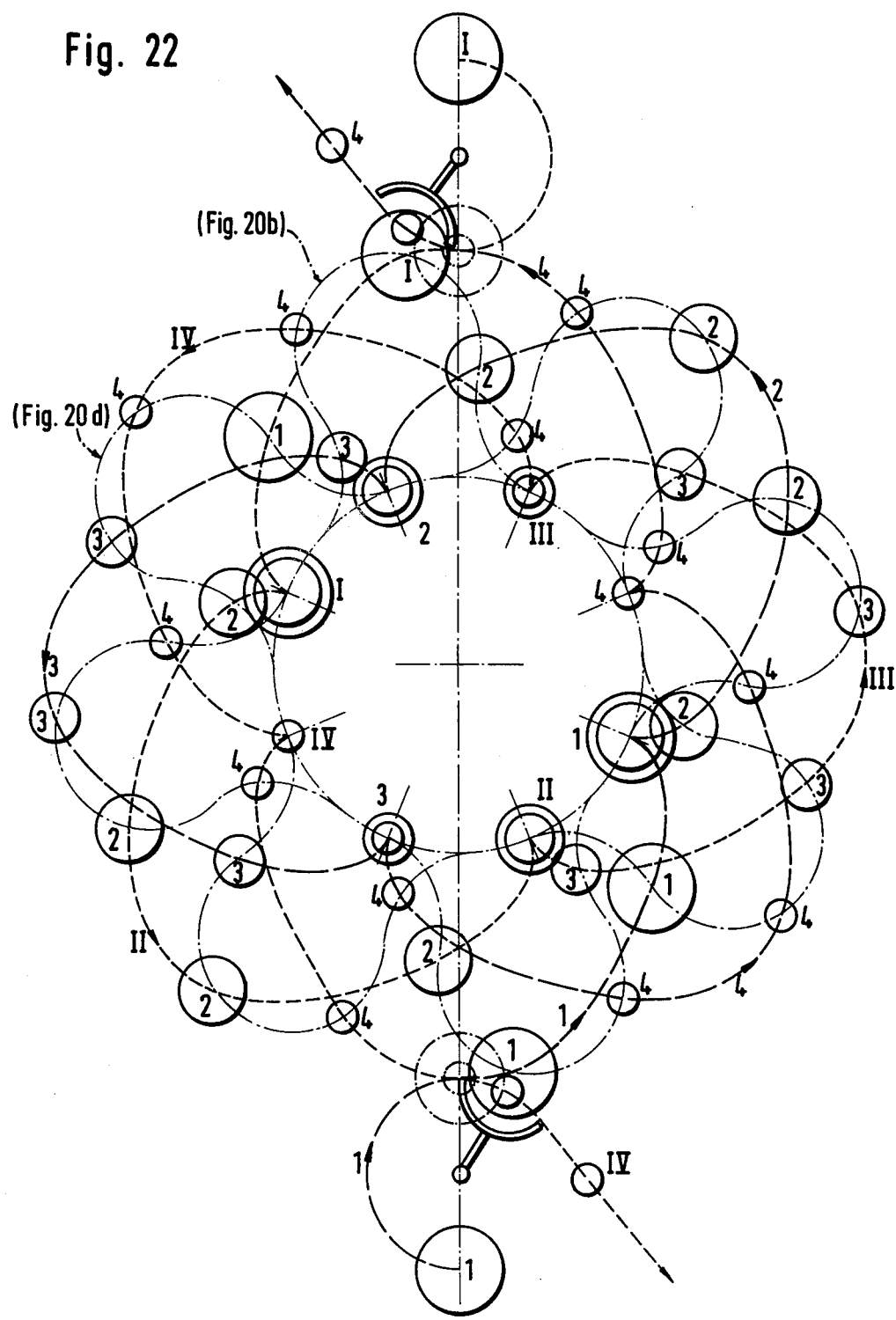
FIG. 22 is a line diagram showing relative positions of components between operations in the system of FIG. 21.

FIG. 22 illustrates the relative positions of components between operations for two sets of four tools. It can be seen that at the instant when an entry turret deposits a component into a tool, there are five components in the handling system.

Figure 23:
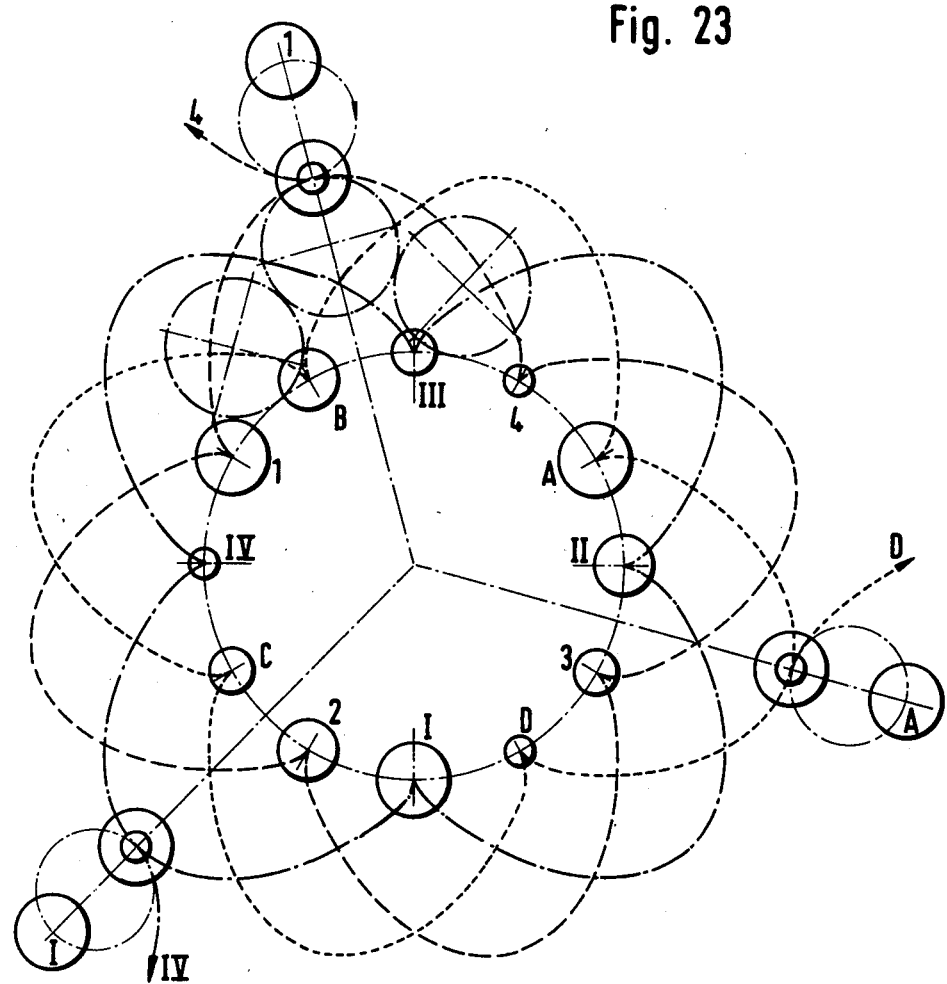
FIG. 23 shows the paths of components between operations in the second transfer system when applied to a press having three sets of four tools.

FIG. 23 shows how a single epicycloidal handling system may be applied to three sets of four tools. With three in-feeds of blanks, it is in effect a tripling of the system shown in FIG. 17. Since the preferred solution of the rotary cam press according to the invention would incorporate 12 working rams, use of three in-feeds is particularly advantageous.

The tool of each of said work stations may either be a conventional drawing or ironing tool, a combination of both, or a multiple tool comprising several coaxially arranged ironing rings. It is to be understood that any other known type of tool suitable for metal working, such as stamping, trimming, flanging, beading etc. may also be used within the protecting scope of the present invention.

We claim :

1. A machine for mechanically treating components, comprising a plurality of fixed work stations arranged in a circular path, transfer mechanism means for advancing each of the components from one work station to at least another station along said circular path, at least one tool at each work station, each tool having a working part which is constrained to move substantially perpendicularly to the plane of the directions in which components are supplied to and collected from the work station, each tool including a ram member, a follower member and means for operating each too while said component is at its work station and for operating all of said tools consecutively, the means for operating each tool including a generally cylindrical cam member having a central axis which passes through the center of said circular path, said cam member defining a cam track which is engaged by said follower members, and means for driving the cam member to rotate about said central axis and thereby act consecutively upon said follower members.

2. A machine according to claim 1, wherein said gear is an internal gear whose center lies on the axis of said output shaft and said speed reduction mechanism comprises a crank provided on said output shaft and having a crank pin, an external gear journalled centrally on said crank pin and in meshing engagement with said internal gear about only a part of the pitch line thereof, and means for preventing said external gear from rotating about its own center while permitting it to rotate about the center of said internal gear.

3. A machine according to claim 2, wherein the means for preventing rotation of said external gear comprise at least two circular openings formed in the external gear between the center and the periphery thereof and two stationary pins fitted in said openings against the interior surface thereof, the radius of said openings being equal to the sum of the radius of said stationary pins and the distance between the axis of said output shaft and of the center of said external gear.

4. A machine according to claim 3, comprising a stern about which the tools are disposed and upon which are mounted means for constraining movement of the working parts of the tools, and wherein the cam member is hollow and is mounted with the stern extending therethrough, said stationary pins being mounted to said stern.

5. A machine for mechanically treating components, comprising a plurality of work stations arranged in a first circle, transfer mechanism means for advancing each of the components from one work station to at least another station along said first circle, at least one tool provided at each work station respectively, each tool having a working part which is constrained to move substantially perpendicularly to the plane of the directions in which components are supplied to and collected from the work station, means for operating each tool while said component is at its work station and for operating all of said tools consecutively, the work stations being symmetrically disposed on the first circle, and the transfer mechansim means including a carrier member, a plurality of pocket members carried by said carrier member, each pocket member adapted to hold a component for transporting it as the carrier member moves, said carrier member having a center, the centers of the pocket members being symmetrically disposed along a second circular path and support means supporting the carrier member so that the center of the second circle is spaced from the center of the first circle and so that the carrier member is movable about the center of the first circle without rotating about the center of the second circle, whereby the center of each pocket member moves in a circle passing through two adjacent stations.

6. A machine as claimed in claim 5, wherein the means for operating the tools include a generally cylindrical cam member having a central axis which passes through the center of said first circle, and means for driving the cam member to rotate about said central axis, said means for driving the cam member comprising a prime mover having an output shaft and a speed reduction mechanism effecting driving connection between said output shaft and said cam member, said speed reduction mechanism also being connected to said carrier member to bring about rotation thereof about the center of the first circle at the same speed as the speed of rotation of cam member.

7. A machine as claimed in claim 5, wherein the carrier member is mounted on at least three parallel crank arms having respective first ends which are stationary with respect to said first circle and respective second ends which are secured to said carrier member, at least one of said crank arms being connected at its first end to means for driving the crank arm to rotate and thereby to cause the carrier member to rotate.

8. A machine according to claim 5, wherein said first circle is, disposed horizontally, and nest means are provided at each of said work stations, each said nest means including a plurality of spaced prongs which extend vertically upwards at one side of the work station for engaging a component being moved into the work station from the opposite side of said work station in one of the pocket members of the carrier member, and each pocket member including a plurality of spaced fingers which extend vertically downwards at one side of the pocket member and which pass between the prongs of the nest means at a work station when the pocket member passes through the work station, whereby when a pocket member, having a component therein, enters the work station from said opposite side the component is retained at the work station by the prongs whereas when an empty pocket member enters the work station from said one side the fingers pass between the prongs and remove from the work station a component located thereat.

9. A machine for mechanically treating components, comprising a plurality of work stations arranged in a circular path, transfer mechanism means for advancing each of the components from one work station to at least another station along said circular path, at least one tool provided at each work station each tool having a working part which is constrained to move substantially perpendicularly to the plane of the directions in which components are supplied to and collected from the work station, means for operating each tool while said component is at its work station and for operating all of said tools consecutively, the work stations being symmetrically disposed on a first circle defining said circular path, and the transfer mechanism including a first gear having its pitch circle equal in diameter to said first circle and having the center of said first circle on its central axis, and at least one turret assembly comprising first, second and third turrets each defining a plurality of pockets for holding components, each pocket having a center and the centers of the pockets of the three turrets being on first, second and third turret circles respectively, each turret including a gear having its pitch circle equal in diameter to the respective turret circle and having the center of the turret circle on its central axis, the gears of the first and second turrets being in meshing engagement with the gear of the third turret, the transfer mechanism further including support means by which the turret assembly is supported so that the gears of the first and second turrets are in meshing engagement with said first gear and the turret assembly is rotatable about the center of said first circle, as the turrets rotate, the pockets of the first and second turrets registering successively with said stations and with the pockets of the third turret, whereby a component can be collected from a first one of the stations py said first turret, transferred to the second turret by way of said third turret, and deposited a second one of the stations by said second turret; and means for causing the support means to rotate about the center of said first circle, which means includes a prime mover having an output shaft, a second gear secured to the support means and a speed reduction mechanism effecting driving connection between said second output shaft and said gear.

10. A machine according to claim 9, wherein said second gear is an internal gear whose center lies on the axis of said output shaft and said speed reduction mechanism comprises a crank provided on said output shaft and having a crank pin, an external gear journalled centrally on said crank pin and in meshing engagement with said internal gear about a part only of the pitch line thereof, and means for preventing said external gear from rotating about its own center while permitting it to rotate about the center of said internal gear.

11. A machine according to claim 10, wherein the means for preventing rotation of said external gear comprise at least two circular openings formed in the external gear between the center and the periphery thereof and two stationary pins fitted in said openings against the interior surface thereof, the radius of said openings being equal to the sum of the radius of said stationary pins and the distance between the axis of said output shaft and the center of said external gear.

12. A machine for mechanically treating metallic components, such as one-piece cans having a body and a bottom, the machine having a frame to which is mounted a plurality of working stations each of the working station having a first respective tool coaxially arranged with respect to a second respective tool, said first and second respective tools being arranged on two circular paths and each of the respective second tools being located on a first end of a ram member, the ram member being slidably supported in a guiding means, a second end of the ram member opposite to said first end being operatively connected to an actuating means, a transfer mechanism being provided in operative relation to said first and second respective tools, the transfer mechanism having transfer elements guided so that in operation they move from one working station to another working station, each of said transfer elements having means for seizing a workpiece at one working station and depositing said workpiece at the other working station, in which the improvement comprises: the first and second respective tools being arranged on two circular paths defined by the periphery of an upright circular cylinder, said first respective tools being rigidly and immovably fastened to said frame, said actuating means being a cylindrical rotary cam member with a substantially vertical central axis, said cam member being rotatably supported and coupled to a driving means by at least one transmission member, said transfer means being driven in synchronism with the rotary motion of said cam member, at least one tool being actuated and at least one workpiece being transferred from one working station to another working station during each rotation of said cam member.

13. A machine according to claim 12, in combination with means for delivering component blanks into the machine and means for extracting finished components from the machine.

14. A machine according to claim 12, in combination with means for feeding strip-form material into the machine and wherein a first of the work stations is provided with a tool for forming component blanks from said strip-form material.

15. A machine according to claim 12, wherein the work stations are in equiangularly spaced relation on a first circle defining said circular path, and the transfer mechanism comprises a first gear having its pitch circle equal in diameter to said first circle and having the center of said first circle on its central axis, and a turret assembly comprising first, second and third turrets each defining a plurality of pockets for receiving components, each pocket defining a center and the centers of the pockets of the three turrets being on first, second and third turret circles respectively, each turret also being provided with a gear having its pitch circle equal in diameter to the respective turret circle and having the center of the turret circle on its central axis, the gears of the first and second turrets being in meshing engagement with the gear of the third turret, and the mechanism further comprising support means whereby the turret assembly is supported so that the gears of the first and second turrets are in meshing engagement with said first gear and the turret assembly is rotatable about the center of said first circle, accompanied by rotation of the turrets, the pockets of the first and second turrets registering successively with said stations and with the pockets of the third turret, whereby a component can be collected from said one station by said first turret, transferred to the second turret by way of said third turret, and deposited in said additional station by said second turret.

16. A machine according to claim 12, wherein at least one additional plurality of work stations is arranged on said circular path with the first-mentioned plurality of work stations, and the transfer mechanism operates to advance components in at least two streams through the pluralities of work stations respectively.

17. A machine according to claim 16, wherein the work stations of the different pluralities alternate about said circular path.

18. A machine according to claim 16, wherein the different pluralities of work stations are defined on different respective segments of said circular path.

19. The machine of claim 12 in which each ram member has a follower member, the cam member defining a cam track which is engaged by said follower members and has a circular projection, the cam member being driven to act consecutively upon said follower members.

20. A machine according to claim 19, wherein the cam profile defines an engagement portion, a disengagement portion and a dwell portion, whereby as each follower member is acted upon the associated ram member successively moves to engage a component at the work station and to disengage therefrom, and then remain disengaged from the component, and said engagement portion has an assembly part and a working part, whereby during the engagement portion the ram member first moves to engage the component without deforming the component and then deforms the component, the cam profile being dimensioned so that at any one time only one follower member engages the working part of the cam profile.

21. A machine for mechanically treating components, particularly metallic hollow members having a body and a bottom, the machine having a stationary frame (10) bearing a plurality of work stations (T1, T2 . . . ) each of which has a tool pair comprising a first fixed tool (13) coaxial with a movable second tool (12), said pairs of first and second tools (13, 12) being arranged on two coaxial circular paths the first tool (13) of each pair on a bolster, the second tool (12) of each on one end of a ram member (25) having a tool bearing end and an actuated end, the ram member (25) being slidably supported in guiding means (26), the actuated end of said ram member (25) connected to cylindrical actuating cam means whose free end is in contact with the actuated ram member end, the improvement wherein:

(a) at least one pair of said tools is different from another pair;
(b) said tool bolster is immovable;
(c) said cam is rotatable by driving means; and
(d) transfer means associated with said machine whereby each component is treated by at least two different pairs of tools.

22. A machine according to claim 21 wherein said bolster is integral with said frame.

23. A machine according to claim 22 wherein said bolster is fastened to said frame.

24. A machine according to claim 22 wherein said circular paths define an upright cylinder.

25. A machine according to claim 22 in which said transfer mechanism comprises a carrier member, a plurality of pocket members carried by said carrier member, each pocket member being adapted to receive a component for transporting it between two of said work stations, said carrier member being connected to drive means so that the center of each pocket member moves in a circle passing through two adjacent work stations.

26. A machine according to claim 25 wherein said carrier member comprises a ring mounted on at least three parallel crank arms having first and second ends being mounted on a circle, the second ends being articulated to said carrier member, at least one of said crank arms being connected to means for driving said crank arm to rotate and thereby to cause the carrier member to perform its swinging movement.

27. A machine according to claim 22 in which the transfer mechanism comprises a carrier member, a plurality of pocket members carried by said carrier member, each pocket member having a center and being adapted to hold a component for transporting the component as the carrier member moves, said carrier member having a center, the centers of the pocket members being disposed along a third circular path and support means supporting the carrier member so that the center of the third circular path is spaced from a center of one of said coaxial circular paths and so that the carrier member is movable about a line through the center of one of said coaxial circular paths without rotating thereabout; whereby the center of each pocket member moves in a circle passing through two adjacent work stations.

28. A machine according to claim 22 in which the transfer mechanism comprises a first gear having it pitch circle equal in diameter to said circular paths and having the centers of said circular paths on its central axis, and at least one turret assembly comprising first, second and third turrets having a plurality of pockets for holding components, each pocket having a center and the centers of the pockets of the three turrets being on first, second and third turret circles respectively, each turret including a gear having its pitch circle equal in diameter to the respective turret circle and having the center of the turret circle on its central axis, the gears of the first and second turrets being in meshing engagement with the gear of the third turret, the transfer mechanism further including support means by which the turret assembly is supported so that the gears of the first and second turrets are is meshing engagement with said first gear and the turret assembly is rotatable about the center of said first circle as the turrets rotate, the pockets of the first and second turrets registering successively with said stations and with the pockets of the third turret, whereby a component can be collected from a first one of the stations by said first turret, transferred to the second turret by said third turret, and deposited at a second one of the stations by said second turret.

29. A machine according to claim 28 in which the transfer mechanism further comprises means for causing the support means to rotate about the centers of said circular paths, which means includes a prime mover having an output shaft, a gear secured to the support means and a speed reduction mechanism effecting driving connection between said output shaft and said gear.

30. A machine for mechanically treating components, comprising a plurality of work stations arranged on a circular path, a transfer mechanism for advancing the components from one work station to at least another work station, at least one tool provided at each work station, each tool having a working part which is constrained to move substantially perpendicularly to the plane of directions in which components enter and leave the work station, and means for operating each tool while a component is at the work station and for operating all of said tools consecutively, wherein the work stations are symmetrically disposed on said circular path, and the transfer mechanism comprises a carrier member, a plurality of pocket members carried by said carrier member, each pocket member being adapted to receive a component for transporting the component between two of said work stations, said carrier member comprising a ring mounted on at least three parallel crank arms having first and second ends, the first ends being mounted on a circle, the second ends being articulated to said carrier member, at least one of said crank arms being connected to means for driving said crank arm to rotate and thereby to cause the carrier member to move so that the center of each pocket member moves in a circle passing through two adjacent work stations.

31. A machine for mechanically treating components, comprising a plurality of work stations arranged on a circular path, a transfer mechanism for advancing the components from one work station to at least another work station, at least one tool provided at each work station, each tool having a working part which is constrained to move perpendicularly to the plane of directions in which components enter and leave the work station, and means for operating each tool while a component is at the work station and for operating all of said tools consecutively, said transfer mechanism having a turret assembly comprising a feed-in turret, an extract turret and at least one transfer turret, each of said turrets defining a plurality of pockets for receiving components, each turret being provided with a gear, the gears of said feed-in and said extract turret being in meshing engagement with the gear of said transfer turret and with a circular gear guiding said turret assembly along said circular path, so that the turret assembly is rotatable on said circular gear as said turrets rotate, the pockets of said feed-in and extract turrets registering successively with said work stations and with the pockets of said transfer turret, means outside said turret assembly for supplying a component thereto, wherein said component is collected from said supply means by said transfer turret, transferred to said feed-in turret and from the feed-in turret to a first work station, collected by said extract turret from said first work station and transferred via said transfer turret to a point outside the turret assembly.

32. The machine as claimed in claim 31 in which said transfer mechanism is adapted to feed said component to said feed-in turret repeatedly to transfer said component to subsequent work stations before the component is removed from the machine by said transfer turret.

* * * * *